US010120510B2

(12) United States Patent
Ono et al.

(10) Patent No.: US 10,120,510 B2
(45) Date of Patent: Nov. 6, 2018

(54) TOUCH SCREEN

(71) Applicant: Mitsubishi Electric Corporation, Tokyo (JP)

(72) Inventors: Takeshi Ono, Tokyo (JP); Tatsuya Nakamura, Tokyo (JP); Tae Orita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/984,592

(22) Filed: Dec. 30, 2015

(65) Prior Publication Data
US 2016/0202802 A1 Jul. 14, 2016

(30) Foreign Application Priority Data

Jan. 8, 2015 (JP) ................................. 2015-002154

(51) Int. Cl.
*G06F 3/044* (2006.01)
(52) U.S. Cl.
CPC .... *G06F 3/044* (2013.01); *G06F 2203/04112* (2013.01)
(58) Field of Classification Search
CPC ........... G06F 3/044; G06F 2203/04112; G06F 2203/04103; G06F 3/0412; H05K 9/00; G02F 1/1343; G02F 1/134336; G02F 1/13338
See application file for complete search history.

(56) References Cited

U.S. PATENT DOCUMENTS

| | | | |
|---|---|---|---|
| 5,844,506 A | 12/1998 | Binstead | |
| 6,137,427 A | 10/2000 | Binstead | |
| 6,452,514 B1 | 9/2002 | Philipp | |
| RE40,867 E | 8/2009 | Binstead | |
| 8,953,131 B2* | 2/2015 | Park | G06F 3/044 345/173 |
| 9,018,536 B2* | 4/2015 | Ullmann | B32B 38/0012 174/257 |
| 9,030,438 B2* | 5/2015 | Cok | G06F 3/044 345/174 |

(Continued)

FOREIGN PATENT DOCUMENTS

| | | |
|---|---|---|
| JP | 9-511086 | 11/1997 |
| JP | 2003-526831 A | 9/2003 |

(Continued)

*Primary Examiner* — Jennifer Mehmood
*Assistant Examiner* — Sardis F Azongha
(74) *Attorney, Agent, or Firm* — Studebaker & Brackett PC

(57) ABSTRACT

A touch screen according to the present invention includes a plurality of row direction wires and a plurality of column direction wires provided to intersect with each other through an insulating film in planar view. The plurality of row direction wires includes a mesh-like wire having a plurality of first row direction wires extending in the longitudinal direction and a plurality of second row direction wires extending in the lateral direction. The plurality of column direction wires includes a mesh-like wire having a plurality of first column direction wires extending in the longitudinal direction and a plurality of second column direction wires extending in the lateral direction, and each of the first row direction wires and each of the first column direction wires are provided at an interval of p/3 or more.

10 Claims, 26 Drawing Sheets

(56) References Cited

U.S. PATENT DOCUMENTS

| | | | |
|---|---|---|---|
| 9,239,654 B2* | 1/2016 | Jang | G06F 3/044 |
| 2009/0273577 A1* | 11/2009 | Chen | G06F 3/044 |
| | | | 345/174 |
| 2011/0102370 A1* | 5/2011 | Kono | G06F 3/044 |
| | | | 345/174 |
| 2012/0062250 A1* | 3/2012 | Kuo | G06F 3/044 |
| | | | 324/686 |
| 2013/0242485 A1 | 9/2013 | Ohtani et al. | |
| 2013/0343010 A1* | 12/2013 | Hwang | G06F 3/041 |
| | | | 361/748 |
| 2014/0152613 A1* | 6/2014 | Ishizaki | G06F 3/0412 |
| | | | 345/174 |
| 2016/0179259 A1* | 6/2016 | Watanabe | G06F 3/044 |
| | | | 345/174 |

FOREIGN PATENT DOCUMENTS

| | | |
|---|---|---|
| JP | 2009-259063 A | 11/2009 |
| JP | 2012-103761 A | 5/2012 |
| JP | 3183253 U | 5/2013 |
| WO | 95/27334 | 10/1995 |
| WO | 00/44018 | 7/2000 |

\* cited by examiner

F I G. 6
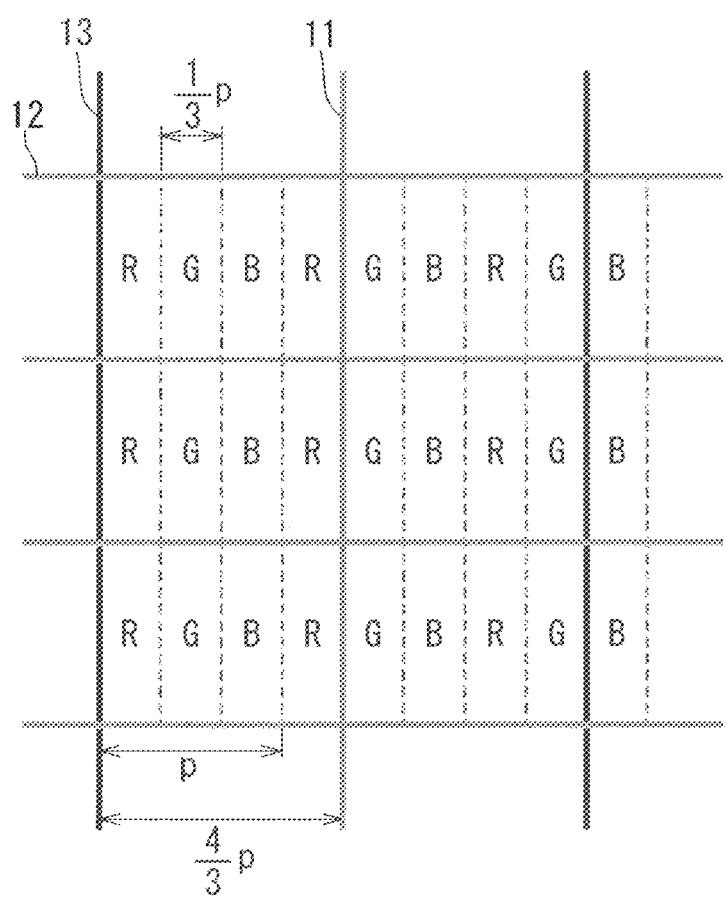

F I G. 2 3
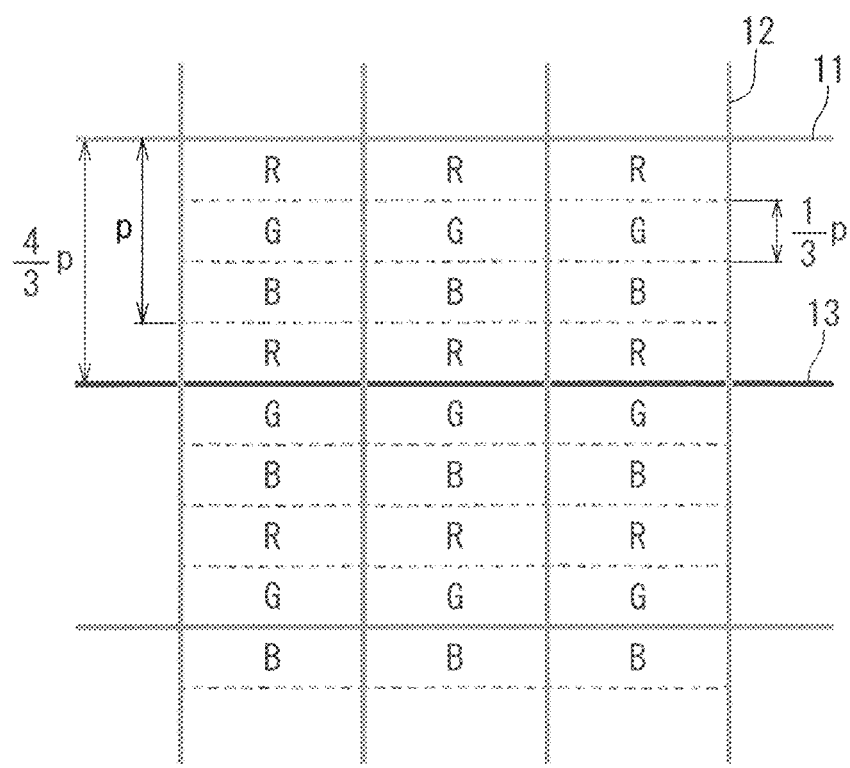

TOUCH SCREEN

BACKGROUND OF THE INVENTION

Field of the Invention

The present invention relates to a touch screen.

Description of the Background Art

A touch panel is a device for detecting a touch operation through an indicator such as a finger and specifying position coordinates of a touched position in the touch panel, and is noted as one of excellent user interface means. At present, touch panels of various types such as a resistive type and a capacitive type are made into products. In general, a touch panel includes a touch screen with a built-in a touch sensor (a sensor for detecting a user's touch operation), and a detecting device for specifying position coordinates of a position in which a touch is made based on a signal input from the touch screen.

As one of the capacitive type touch panels, there is a projected capacitive type touch panel (for example, see Japanese Patent Application Laid-Open No. 2012-103761). The projected capacitive type touch panel described in Japanese Patent Application Laid-Open No. 2012-103761 can detect a touch operation even if a front surface of a touch screen with a built-in touch sensor is covered with a protective plate such as a glass plate having a thickness of approximately several millimeters. The projected capacitive type touch panel is advantageously robust because the protective plate can be disposed on the front surface of the touch screen. Also in the case where a user touches the touch screen with gloves worn, moreover, the touch operation can be detected. Furthermore, the projected capacitive type touch panel has no moving unit, and thus no failure or the like caused by a movable operation of the moving unit. For this reason, a longer life can be achieved.

The projected capacitive type touch panel includes, as detection wires for detecting an electrostatic capacitance, a first series of conductive element formed on a thin dielectric film and a second series of conductive element formed above the first series of conductive element via an insulating film, for example (see Japanese Unexamined Patent Application Publication (Translation of PCT Application) No. 9-511086 (1997), for example). Each of the conductor elements forms a plurality of intersection points without any electrical contact therebetween. With the configuration described in Japanese Unexamined Patent Application Publication (Translation of PCT Application) No. 9-511086 (1997), a detection circuit detects an electrostatic capacitance formed between an indicator such as a finger and the first series of conductive element and the second series of conductive element that are the detection wires so that position coordinates of a position touched by the indicator are specified. A method of detecting the position coordinates is generally referred to as a self-capacitance detection method.

Moreover, there is a detection method for specifying position coordinates of a touched position by detecting an electric field change between a plurality of row wires extending in a row direction and configuring a first electrode and a plurality of column wires extending in a column direction and configuring a second electrode, that is, a change in a mutual capacitance (for example, see Japanese Unexamined Patent Application Publication (Translation of PCT Application) No. 2003-526831). The detection method is generally referred to as a mutual capacitance detection method.

In both cases of the self-capacitance detection method and the mutual capacitance detection method, there is generally employed a method of, when a plane region (a detection cell) divided like a grid by the row wires and the column wires is touched with an indicator such as a finger, specifying position coordinates of a touched position based on balance between a detection value in the touched detection cell (sensor block) and a detection value in a detection cell in the vicinity of the sensor block.

In order to enlarge a size of a touch panel and to increase a speed, recently, touch panels have been increased which is configured by using a fine wire-shaped electrode utilizing a metallic material having a low resistance instead of a transparent conductive film such as Indium Tin Oxide (ITO) utilized so far. In a liquid crystal module provided with the touch panel using the fine wire-shaped electrode, it is necessary to suppress moire caused by an interference of a fine wire-shaped electrode pattern and a black matrix (BM) pattern formed on a color filter (CF) substrate. For example, there is conventionally disclosed the technique for suppressing moire by forming a fine wire-shaped electrode such that a fine wire-shaped electrode pattern overlaps with a black matrix pattern in planar view (for example, see Japanese Patent Application Laid-Open No. 2009-259063).

In Japanese Patent Application Laid-Open No. 2009-259063, the fine wire-shaped electrode pattern is formed to overlap with the black matrix pattern in planar view at an interval which is three times as great as a pitch in a lateral direction of a sub-pixel. With such a configuration, the black matrix and the fine wire-shaped electrode are seen with a shift depending on a viewing angle. Therefore, there are seen transmitted light from a sub-pixel having a transmittance reduced by the fine wire-shaped electrode and transmitted light from a sub-pixel having no transmittance reduced by the fine wire-shaped electrode. Accordingly, there is a problem in that a gradation of R, G and B is unbalanced, resulting in occurrence of color unevenness. In order to eliminate the color unevenness, it is sufficient to form a wire pattern with an inclination in a 45-degree direction. However, in some cases in which a touch screen is attached to an inside of a polarizing plate disposed on a display surface of a liquid crystal panel (LCD) as in an ON cell touch panel, for example, a polarizing direction of light converted through a polarizing plate disposed on a back side of the liquid crystal panel from a back light is changed in an unexpected direction by a fine wire-shaped electrode formed on a glass substrate for a touch screen. In these cases, there is a problem in that a luminous part is generated in black display, resulting in a reduction in a contrast ratio.

SUMMARY OF THE INVENTION

The present invention has been made to solve such problems and an object thereof is to provide a touch screen which can suppress color unevenness and prevent a reduction in a contrast ratio.

A touch screen includes a plurality of row direction wires and a plurality of column direction wires provided to intersect with each other through an insulating film in planar view in a region corresponding to a region of a display element in which a plurality of sub-pixels are formed, the sub-pixels being disposed regularly in a lateral direction and a longitudinal direction and forming R, G and B having a pitch in the lateral direction of p/3. The plurality of row direction wires includes a mesh-like wire having a plurality of first row direction wires extending in the longitudinal direction and a plurality of second row direction wires extending in the lateral direction. The plurality of column direction wires include a mesh-like wire having a plurality of first column direction wires extending in the longitudinal direction and a plurality of second column direction wires extending in the lateral direction. Each of the first row direction wires and each of the first column direction wires are provided at an interval of p/3 or more.

According to the present invention, the touch screen includes a plurality of row direction wires and a plurality of column direction wires provided to intersect with each other through an insulating film in planar view in a region corresponding to a region of a display element in which a plurality of sub-pixels are formed, the sub-pixels being disposed regularly in a lateral direction and a longitudinal direction and forming R, G and B having a pitch in the lateral direction of p/3. The plurality of row direction wires includes a mesh-like wire having a plurality of first row direction wires extending in the longitudinal direction and a plurality of second row direction wires extending in the lateral direction. The plurality of column direction wires includes a mesh-like wire having a plurality of first column direction wires extending in the longitudinal direction and a plurality of second column direction wires extending in the lateral direction. Each of the first row direction wires and each of the first column direction wires are provided at an interval of p/3 or more. Therefore, it is possible to suppress color unevenness and to prevent a reduction in a contrast ratio.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is an enlarged view showing an example of a region A in FIG. 5;

FIG. 23 is an enlarged view showing a row direction wire and a column direction wire in a region in which the row direction wire and the column direction wire overlap with each other in planar view according to a fifth preferred embodiment of the present invention;

DESCRIPTION OF THE PREFERRED EMBODIMENTS

Preferred embodiments according to the present invention will be described below with reference to the drawings.

First Preferred Embodiment

Figure 1:
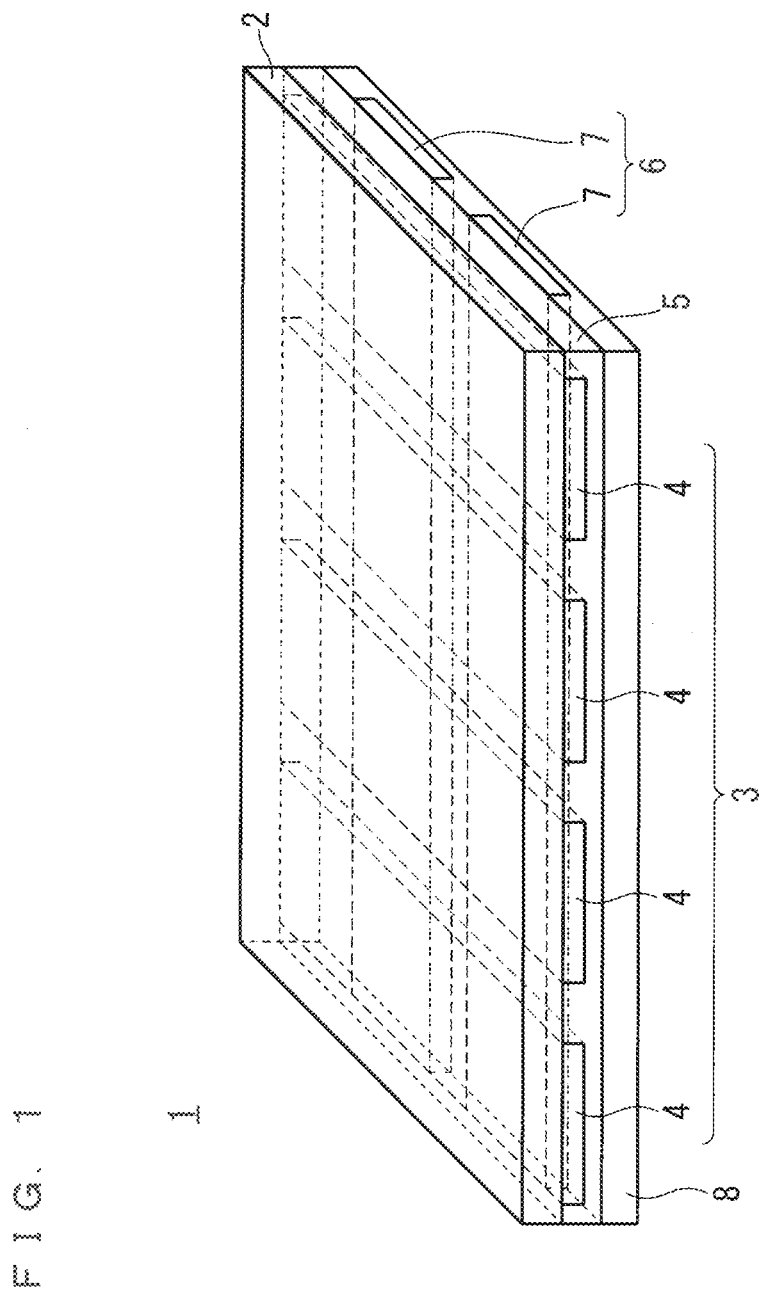
FIG. 1 is a perspective view showing an example of a configuration of a touch screen according to a first preferred embodiment of the present invention.

FIG. 1 is a perspective view showing an example of a configuration of a touch screen 1 according to a first preferred embodiment of the present invention. It is assumed that the touch screen 1 is a projected capacitive type touch screen.

A transparent substrate 2 formed of a transparent glass material or a transparent resin is provided as an upper surface layer of the touch screen 1. An upper electrode 3 is formed on a back surface of the transparent substrate 2, and an interlayer insulating film 5 is formed to cover the upper electrode 3. The interlayer insulating film 5 is a transparent insulating film (having translucency) such as a silicon nitride film or a silicon oxide film.

A lower electrode 6 is formed on a back surface of the interlayer insulating film 5, and a protective film 8 is formed to cover the lower electrode 6. The protective film 8 is a transparent insulating film such as a silicon nitride film or a silicon oxide film in the same manner as the interlayer insulating film 5.

The upper electrode 3 has a plurality of column direction wires 4 formed of a transparent wire material such as ITO or a metallic wire material such as aluminum. Moreover, the lower electrode 6 has a plurality of row direction wires 7 formed of the same material as the column direction wire 4.

Although FIG. 1 shows the case where the column direction wire 4 is disposed on an upper layer of the row direction wire 7, the row direction wire 7 may be disposed on an upper layer of the column direction wire 4.

In the first preferred embodiment, the column direction wire 4 and the row direction wire 7 have a multilayer structure of an aluminum-based alloy layer and a nitride layer thereof. By employing such a structure, it is possible to reduce a wire resistance and to enhance a transmittance of light in a detectable area. Herein, the detectable area implies an area where a touch operation made with an indicator such as a finger can be detected on the touch screen 1 (the details will be described later).

A user touches the transparent substrate 2 that is a surface of the touch screen 1 with the indicator such as the finger, thereby performing an operation. When the indicator touches the transparent substrate 2, a cross capacitance between the column direction wire 4 and the row direction wire 7 is changed. By detecting this cross capacitance change, it is possible to specify at which position inside the detectable area the transparent substrate 2 is touched.

Figure 2:
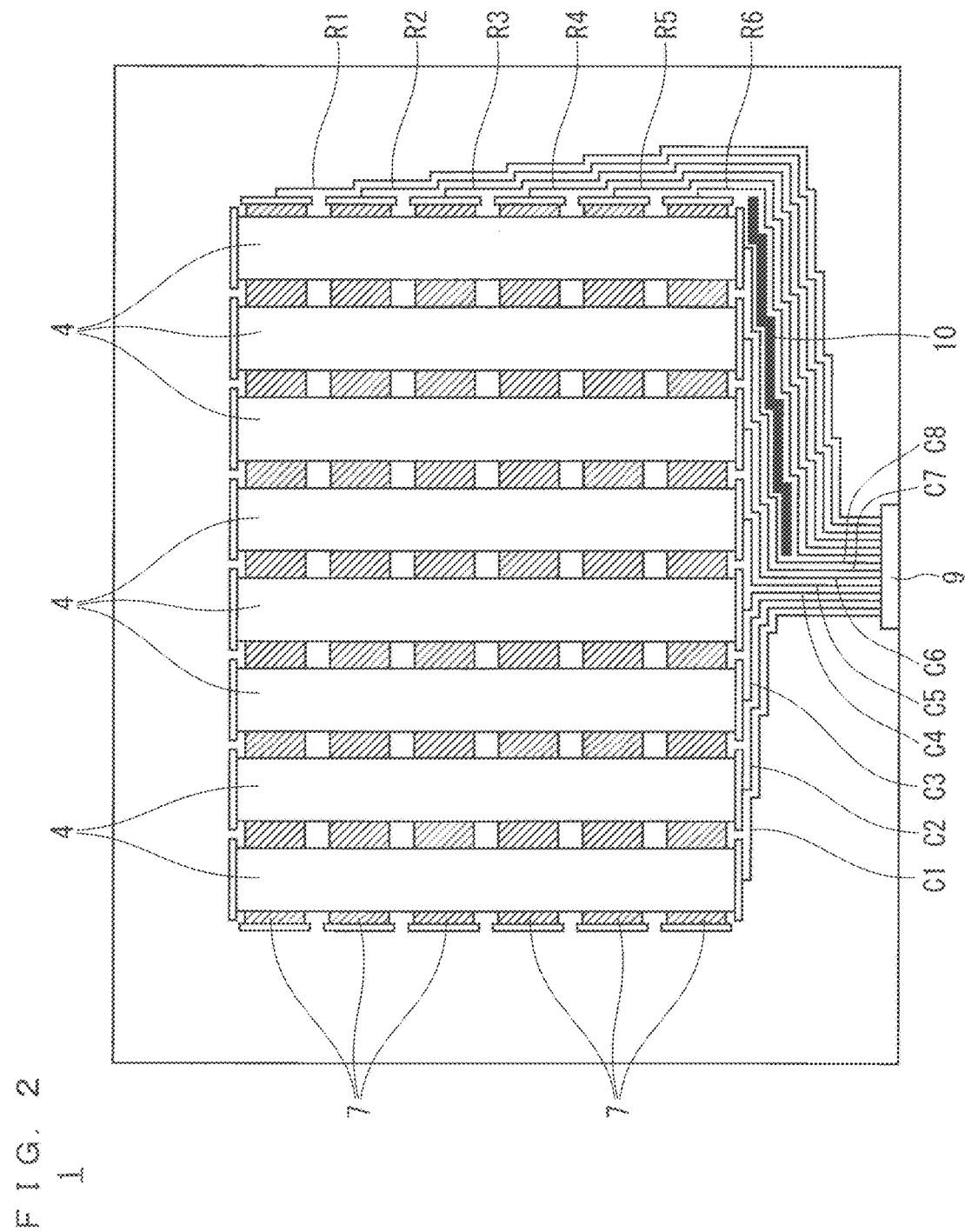
FIG. 2 is a plan view showing an example of the configuration of the touch screen according to the first preferred embodiment of the present invention.

FIG. 2 is a plan view showing an example of the configuration of the touch screen 1.

The detectable area in the touch screen 1 is a matrix region made up of a plurality of row direction wires 7 extending in a row direction (a transverse direction of the paper) and a plurality of column direction wires 4 overlapping in planar view on a front side of the row direction wire 7 and extending in a column direction (a vertical direction of the paper).

Each of the row direction wires 7 is connected to a terminal 9 for electrical connection to an external wire through lead wires R1 to R6. Each of the column direction wires 4 is connected to the terminal 9 through lead wires C1 to C8. Moreover, a dummy lead wire 10 is disposed between the lead wire R6 and the lead wire C8.

The lead wires R1 to R6 and the lead wires C1 to C8 are disposed close to an outer peripheral side of the detectable area. At this time, the lead wires R1 to R6 are disposed with the shortest lead wire R6 provided on an innermost side, and the other lead wires R1 to R5 are disposed along the lead wire R6. Moreover, the lead wires C1 to C8 are disposed with the shortest lead wire C4 set as a reference, and the other lead wires C1 to C3 and lead wires C5 to C8 are disposed along the lead wire C4.

By disposing the lead wires R1 to R6 and the lead wires C1 to C8 close to the outer peripheral side of the detectable area, thus, it is possible to suppress a fringe capacitance generated between a display device for attaching the touch screen 1 and the lead wires excluding the lead wire R1 and the lead wire C1 at outermost edges (the lead wires R2 to R6 and the lead wires C2 to C8).

By setting the lead wires R1 to R6 and the lead wires C1 to C8 as the wires, moreover, it is possible to reduce an influence on the lead wire by an electromagnetic noise generated from the display device attaching the touch screen 1.

In FIGS. 1 and 2, for easy explanation, the row direction wire 7 and the column direction wire 4 are not shown so as to have a mesh-like structure (the details will be described later).

Next, the structures of the row direction wire 7 and the column direction wire 4 will be described with reference to FIGS. 3 to 6. In FIGS. 3 to 6, the transverse direction of the paper is set to be the row direction and the vertical direction of the paper is set to be the column direction. FIGS. 3 to 6 schematically show wire patterns of the row direction wire 7 and the column direction wire 4, and thicknesses of the wires and arrangement intervals between the wires are different from an actual situation. It is assumed that a longitudinal direction of a sub-pixel of the liquid crystal panel to be attached to the touch screen 1 is parallel with the column direction in FIGS. 3 to 6. It is assumed that the row direction wire 7 and the column direction wire 4 are disposed in an overlapping position with a pattern (not shown) of a black matrix for dividing respective sub-pixels (the details will be described later) in planar view.

Figure 3:
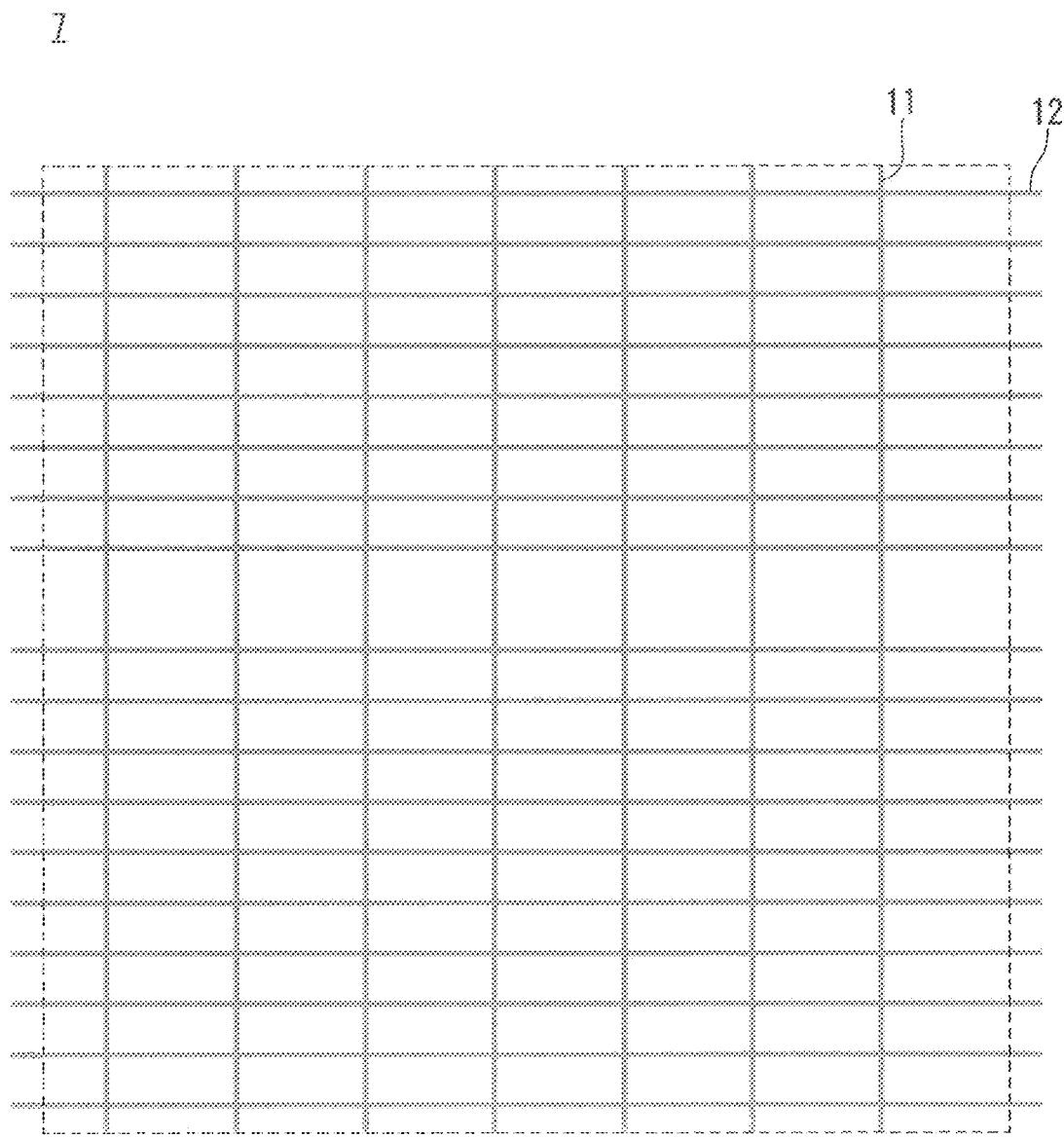
FIG. 3 is an enlarged view showing a row direction wire in a region in which the row direction wire and a column direction wire overlap with each other in planar view according to the first preferred embodiment of the present invention.

FIG. 3 is an enlarged view showing the row direction wire 7 in the region in which the row direction wire 7 and the column direction wire 4 overlap with each other in planar view (see FIG. 2). In FIG. 3, a region surrounded by a broken line indicates a region in which the row direction wire 7 and the column direction wire 4 overlap with each other in planar view.

The row direction wire 7 configuring the lower electrode 6 is formed of a mesh-like wire made of conductive wires. Specifically, the mesh-like wire forming the row direction wire 7 includes a first row direction wire 11 extending in the longitudinal direction of the sub-pixel (the column direction) and a second row direction wire 12 extending in a lateral direction (the row direction) that is a perpendicular direction to the longitudinal direction of the sub-pixel. More specifically, the first row direction wire 11 is extended in a parallel direction with the column direction.

The first row direction wires 11 are provided at a regular interval in the row direction. Although the second row direction wires 12 are provided at a regular interval in the column direction, the second row direction wires 12 are not disposed in a central part of the region in which the row direction wire 7 and the column direction wire 4 overlap with each other in planar view. Specifically, the second row direction wire 12 corresponding to a single wire is not provided in the central part.

Figure 4:
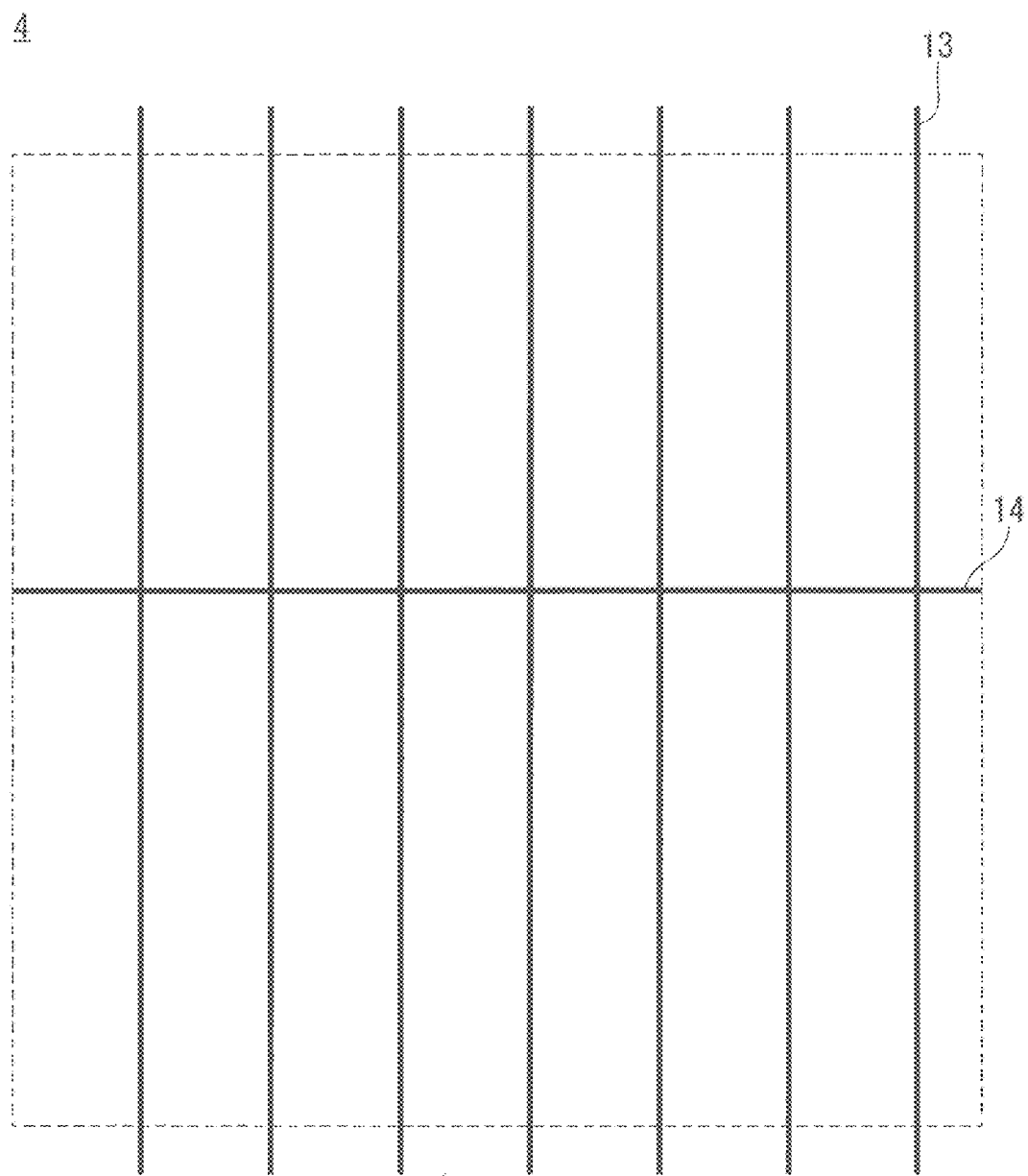
FIG. 4 is an enlarged view showing the column direction wire in the region in which the row direction wire and the column direction wire overlap with each other in planar view according to the first preferred embodiment of the present invention.

FIG. 4 is an enlarged view showing the column direction wire 4 in the region in which the row direction wire 7 and the column direction wire 4 overlap with each other in planar view. In FIG. 4, a region surrounded by a broken line corresponds to the region surrounded by the broken line in FIG. 3.

The column direction wire 4 configuring the upper electrode 3 is formed of a mesh-like wire made of conductive wires. Specifically, the mesh-like wire forming the column direction wire 4 includes a first column direction wire 13 extending in the column direction and a second column direction wire 14 extending in the row direction. More specifically, the first column direction wire 13 is extended in a parallel direction with the column direction.

The first column direction wires 13 are provided at a regular interval in the row direction. Moreover, the second column direction wire 14 is provided in the central part of the region in which the row direction wire 7 and the column direction wire 4 overlap with each other in planar view.

Figure 5:
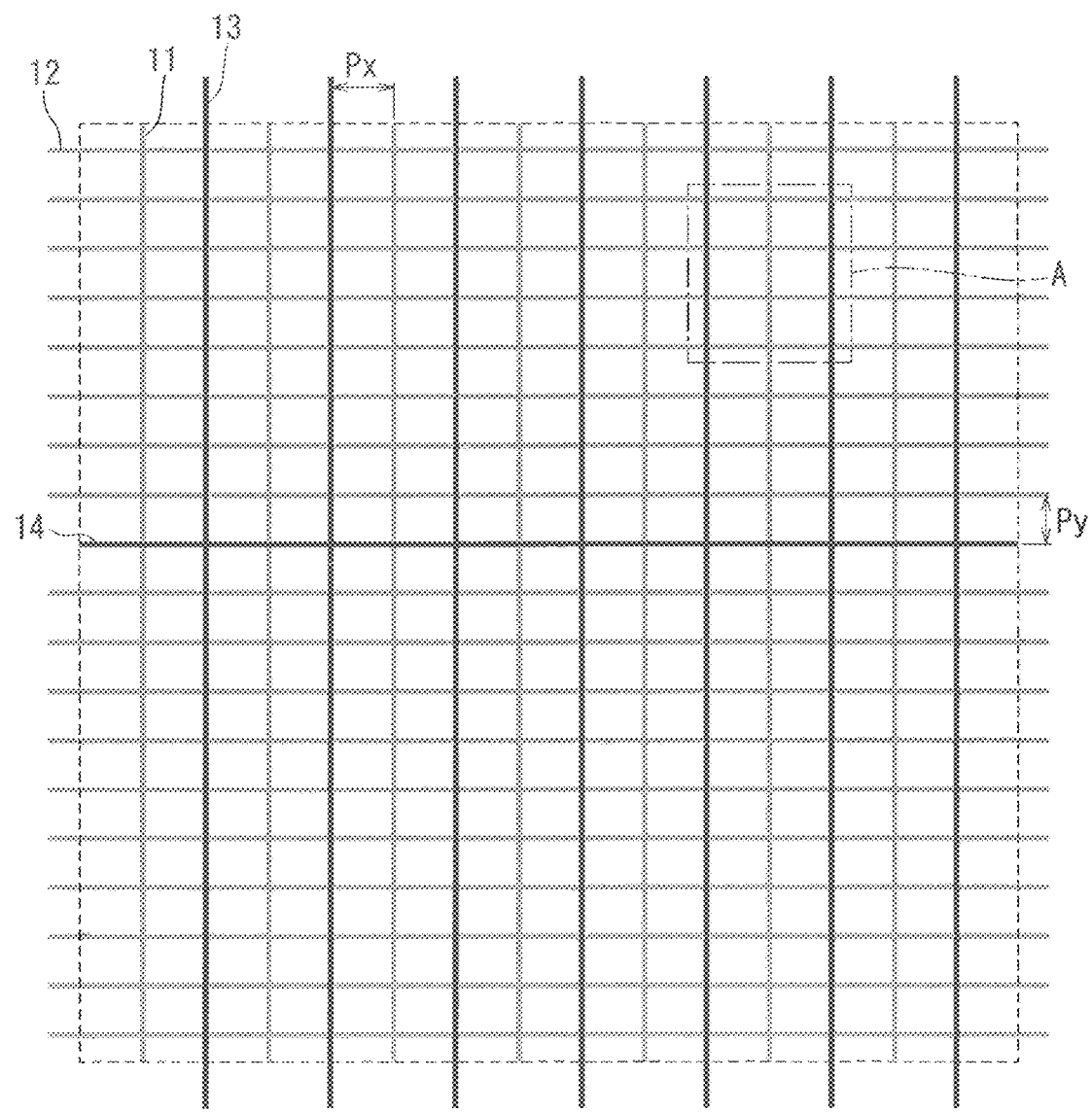
FIG. 5 is an enlarged view showing the row direction wire and the column direction wire in the region in which the row direction wire and the column direction wire overlap with each other in planar view according to the first preferred embodiment of the present invention.

FIG. 5 is an enlarged view showing the row direction wire 7 and the column direction wire 4 in the region in which the row direction wire 7 and the column direction wire 4 overlap with each other in planar view, illustrating a state in which FIGS. 3 and 4 are combined with each other. In FIG. 5, a region surrounded by a broken line corresponds to the region surrounded by the broken lines in FIGS. 3 and 4.

In the row direction of the mesh-like wire including the first row direction wire 11 and the first column direction wire 13, the first row direction wires 11 and the first column direction wires 13 are alternately provided at a regular interval (an interval Px).

In the column direction of the mesh-like wire including the second row direction wire 12 and the second column direction wire 14, moreover, the second row direction wires 12 and the second column direction wires 14 are provided at a regular interval (an interval Py).

FIG. 6 is an enlarged view showing an example of a region A in FIG. 5, illustrating a positional relationship of a pixel pattern in the liquid crystal panel (a display element) to be attached to the touch screen 1 with the row direction wire 7 and the column direction wire 4.

Each of the sub-pixels is disposed regularly in the lateral direction and the longitudinal direction in the liquid crystal panel, and each of R, G and B with a pitch in the lateral direction of p/3 is formed. The first row direction wires 11 and the first column direction wires 13 are alternately disposed at an interval of 4p/3 with respect to a pixel (a pitch p) including the respective sub-pixels in the row direction. Herein, the interval 4p/3 corresponds to the interval Px in FIG. 5. By such arrangement, the first row direction wire 11 and the first column direction wire 13 evenly block respective regions including sub-pixels R, G and B when a user sees a screen in an oblique direction. Therefore, a gradation is balanced so that color unevenness can be suppressed.

In the first preferred embodiment, it is assumed that the first row direction wire 11, the second row direction wire 12, the first column direction wire 13 and the second column direction wire 14 have a width (a line width) of 3 μm, the interval Px in the row direction is 400 μm and the interval Py in the column direction is 300 μm. In other words, in the case where the first row direction wire 11 and the first column direction wire 13 have a line width t, the first row direction wire 11 and the first column direction wire 13 are provided at an interval of 100 t or more.

Figure 7:
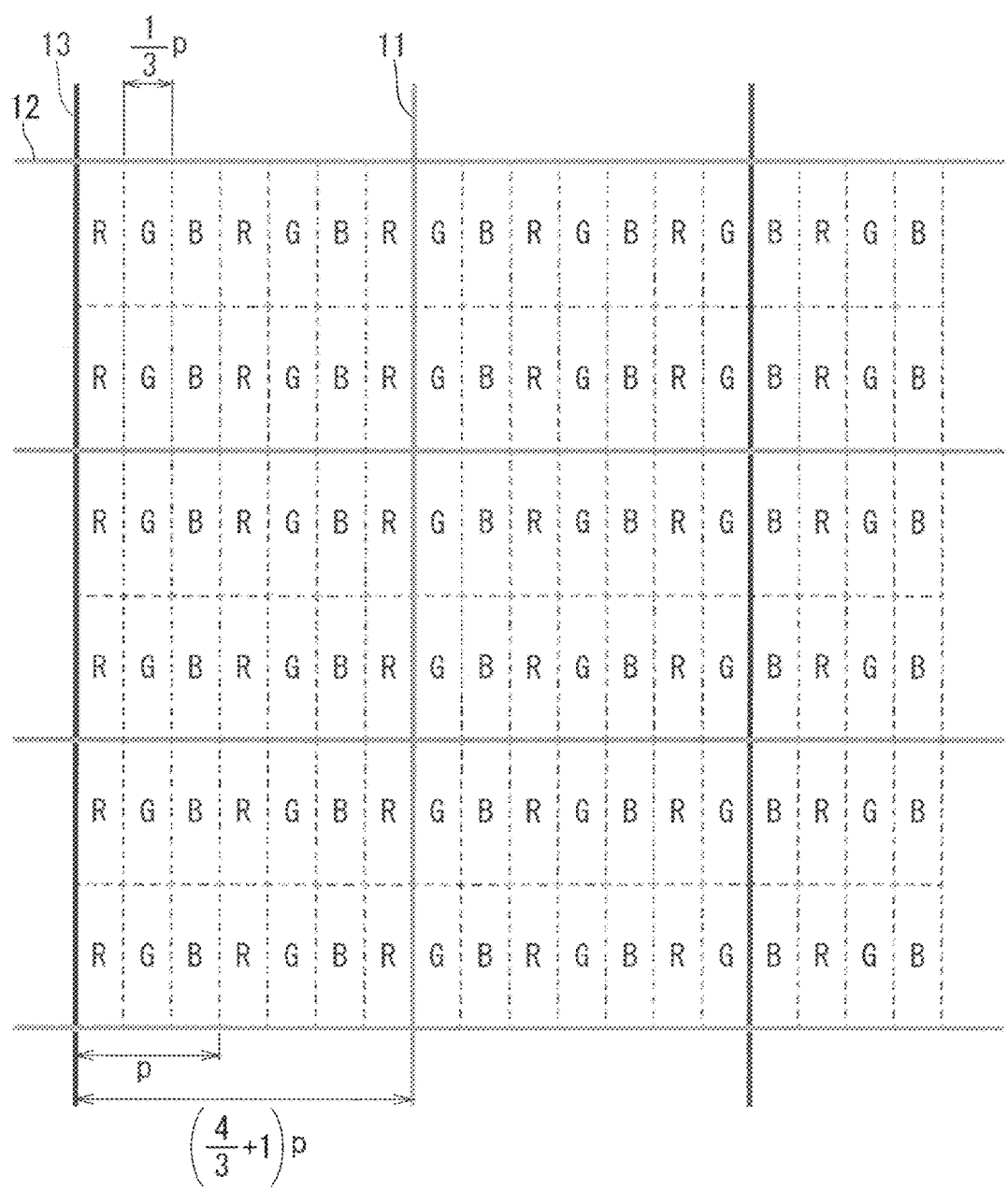
FIG. 7 is an enlarged view showing another example of the region A in FIG. 5.

When a pitch of a pixel is decreased, moreover, the interval Px in the row direction is also reduced. In this case, there is a problem in that the first row direction wire 11 and the first column direction wire 13 intercept transmitted light in the respective sub-pixels (the sub-pixels R, G and B), so that a transmittance is reduced and a stripe-shaped light and shade pattern (moire) can be easily visually recognized when the user sees the screen in the oblique direction. As a countermeasure to be taken against the problem, the interval of the arrangement of the first row direction wire 11 and the first column direction wire 13 is set to be $((4/3)+n) \times p$ (n=1) as shown in FIG. 7. Consequently, it is possible to obtain the same advantages as those in the case of the configuration in FIG. 6.

In FIG. 7, it is desirable to select n in such a manner that the first row direction wire 11, the second row direction wire 12, the first column direction wire 13 and the second column direction wire 14 have constant widths and a total area of the first row direction wire 11, the second row direction wire 12, the first column direction wire 13 and the second column direction wire 14 is equal to or smaller than 1% of an area of a whole display area.

Even if the first row direction wire 11 and the first column direction wire 13 are provided at the interval Px satisfying the condition so that the first row direction wire 11 and the first column direction wire 13 intercept the transmitted light in each of the sub-pixels when the user sees the screen in the oblique direction, the reduction in the transmittance is equal to or smaller than 1% in total and the moire is not recognized visually.

In order to confirm the advantages in the first preferred embodiment, the touch screen 1 having the wire structure shown in FIG. 5 was attached to the liquid crystal panel to confirm by visual observation whether the color unevenness occurs in a state of white display. However, the color unevenness was not recognized visually. On the other hand, as disclosed in Japanese Patent Application Laid-Open No. 2009-259063, for example, a touch screen including wires in a row direction disposed at an equal interval to a pitch of a pixel was visually observed by the same method as described above. Consequently, the color unevenness was recognized visually. The color unevenness was visually recognized in such a manner that a striped pattern (a vertical stripe) colored in each of magenta, cyan and yellow spreads in the row direction. This is caused by distribution of a region having only a transmittance reduced in the sub-pixel R, a region having only a transmittance reduced in the sub-pixel G and a region having only the transmittance reduced in the sub-pixel B depending on a viewing angle, resulting in occurrence of coloring.

From the foregoing, according to the first preferred embodiment, there is employed the configuration in which the first row direction wire 11 and the first column direction wire 13 evenly block the respective regions of the sub-pixels R, G and B when the user sees the screen in the oblique direction. Therefore, the gradation is balanced (the reduction in the contrast ratio is prevented) so that the color unevenness can be suppressed.

By setting the row direction wire 7 and the column direction wire 4 to be the mesh-like wires, moreover, it is possible to form a wide detectable area with a small wire area.

The materials, line widths and arrangement interval of the row direction wire 7 and the column direction wire 4 are not restricted to the foregoing. For example, a transparent conductive material such as ITO or graphene or a metallic material such as aluminum, chromium, copper or silver may be used as the materials of the row direction wire 7 and the column direction wire 4. Moreover, it is also possible to employ alloys of aluminum, chromium, copper, silver or the like, or a multilayer structure in which aluminum nitride or the like is formed on any of these alloys. In addition, the line width and the interval can also have different values from the values described above depending on uses of the touch screen or the like.

Second Preferred Embodiment

In the first preferred embodiment, the description has been given of the case where the first row direction wire 11, the second row direction wire 12, the first column direction wire 13, and the second column direction wire 14 take the linear shapes. In this case, when the surface of the touch screen is irradiated with strong light such as sunlight, reflected light in the row and column directions is intensified so that an outdoor display visibility tends to be reduced.

The second preferred embodiment according to the present invention has a feature that a first row direction wire 11, a second row direction wire 12, a first column direction wire 13, and a second column direction wire 14 take curved shapes.

Structures of the row direction wire 7 and the column direction wire 4 will be described with reference to FIGS. 8 to 12.

Figure 8:
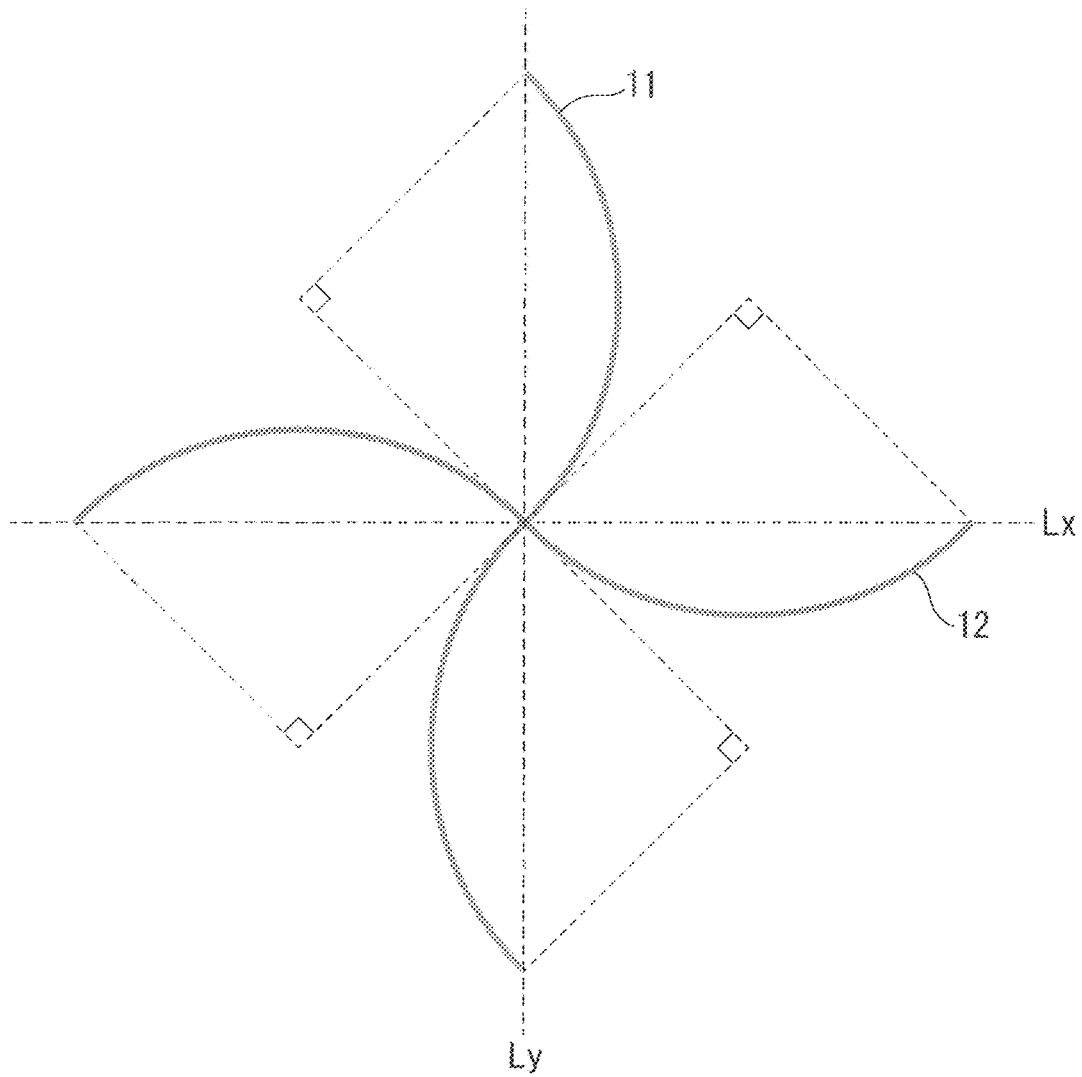
FIG. 8 is a view showing an example of a shape of a row direction wire according to a second preferred embodiment of the present invention.

FIG. 8 is a view showing an example of shapes of the first row direction wire 11 and the second row direction wire 12 according to the second preferred embodiment.

Each of the first row direction wires 11 and the second row direction wires 12 is disposed like a circular arc (in a curved shape) so as to be point symmetrical with each other around an intersection point of the first row direction wire 11 and the second row direction wire 12. In other words, the first row direction wire 11 and the second row direction wire 12 are provided in a meandering form. Moreover, respective circular arcs (four circular arcs in FIG. 8) are provided at a circumferential angle of 90 degrees along a center line Lx or Ly and the whole part (including the four circular arcs) forms 360 degrees.

Although the first row direction wire 11 and the second row direction wire 12 have been described above, the same also applies to the first column direction wire 13 and the second column direction wire 14.

Figure 9:
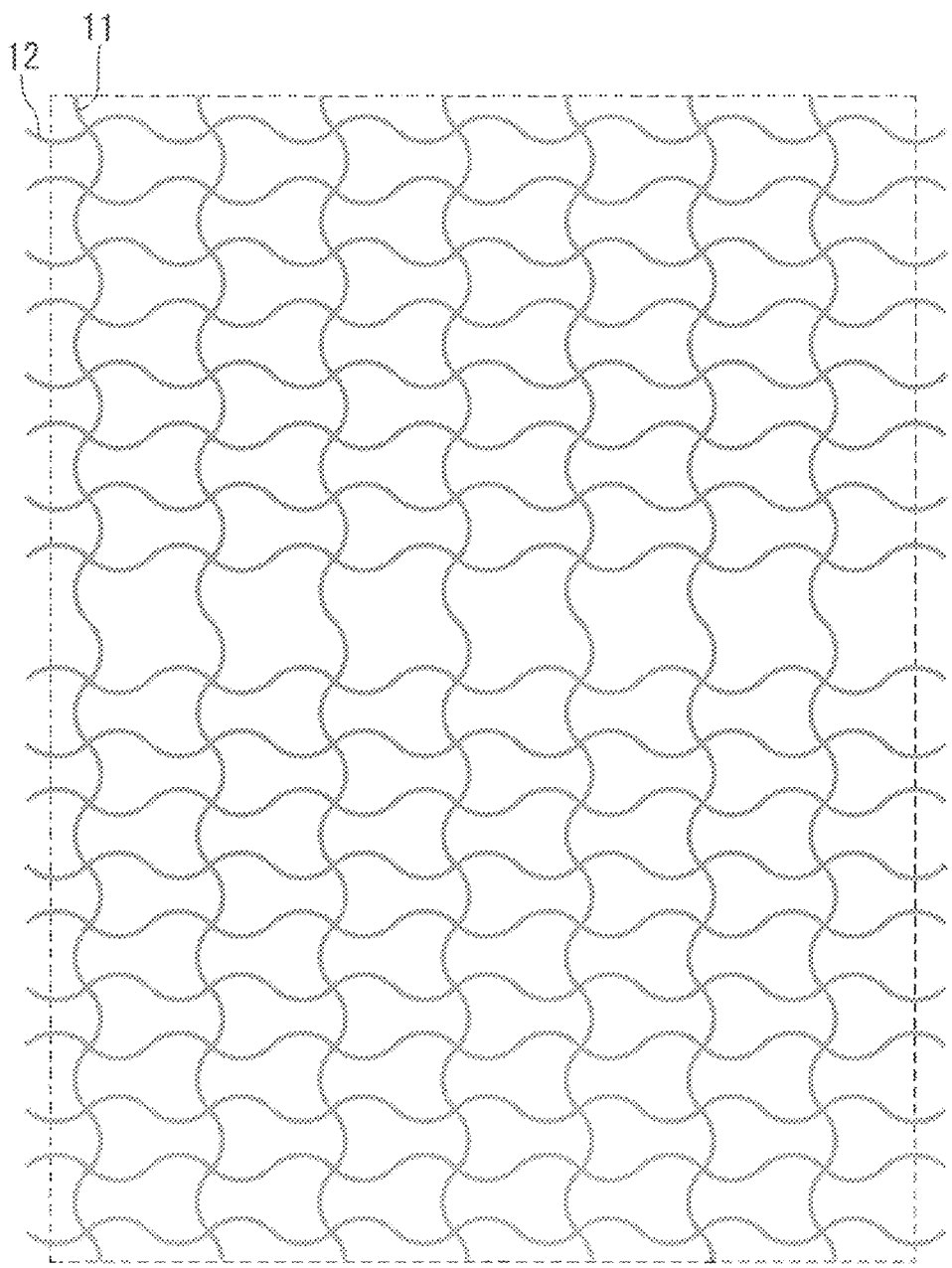
FIG. 9 is an enlarged view showing a row direction wire in a region in which the row direction wire and a column direction wire overlap with each other in planar view according to the second preferred embodiment of the present invention.

FIG. 9 is an enlarged view showing the row direction wire 7 in the region in which the row direction wire 7 and the column direction wire 4 overlap with each other in planar view (see FIG. 2). In FIG. 9, a region surrounded by a broken line indicates a region in which the row direction wire 7 and the column direction wire 4 overlap with each other in planar view.

The first row direction wires 11 are formed in a curved shape (formed with the shape of FIG. 8 taken continuously) and are provided at a regular interval in the row direction. Herein, the first row direction wire 11 is extended substantially in a column direction. Although the second row direction wires 12 are formed in a curved shape (formed with the shape of FIG. 8 taken continuously) and are provided at a regular interval in the column direction, moreover, the second row direction wires 12 are not disposed in a central part of the region in which the row direction wire 7 and the column direction wire 4 overlap with each other in planar view. Specifically, the second row direction wire 12 corresponding to a single wire is not provided in the central part.

Figure 10:
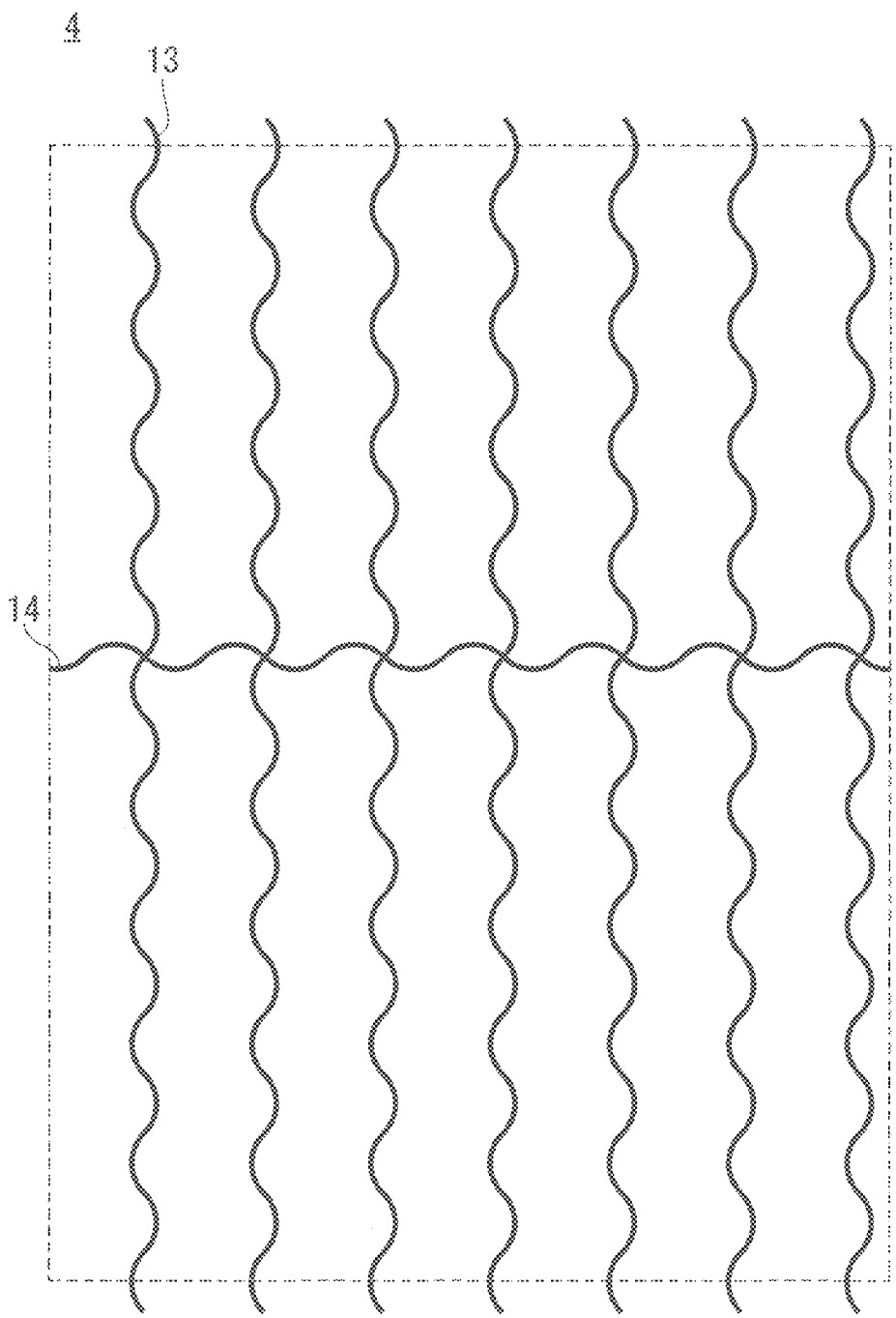
FIG. 10 is an enlarged view showing the column direction wire in the region in which the row direction wire and the column direction wire overlap with each other in planar view according to the second preferred embodiment of the present invention.

FIG. 10 is an enlarged view showing the column direction wire 4 in the region in which the row direction wire 7 and the column direction wire 4 overlap with each other in planar view. In FIG. 10, a region surrounded by a broken line corresponds to the region surrounded by the broken line in FIG. 9.

The first column direction wires 13 are formed in a curved shape (formed with the shape of FIG. 8 taken continuously) and are provided at a regular interval in the row direction. Herein, the first column direction wire 13 is extended substantially in a column direction. Although the second column direction wires 14 are formed in a curved shape (formed with the shape of FIG. 8 taken continuously) and are disposed in the central part of the region in which the row direction wire 7 and the column direction wire 4 overlap with each other in planar view.

Figure 11:
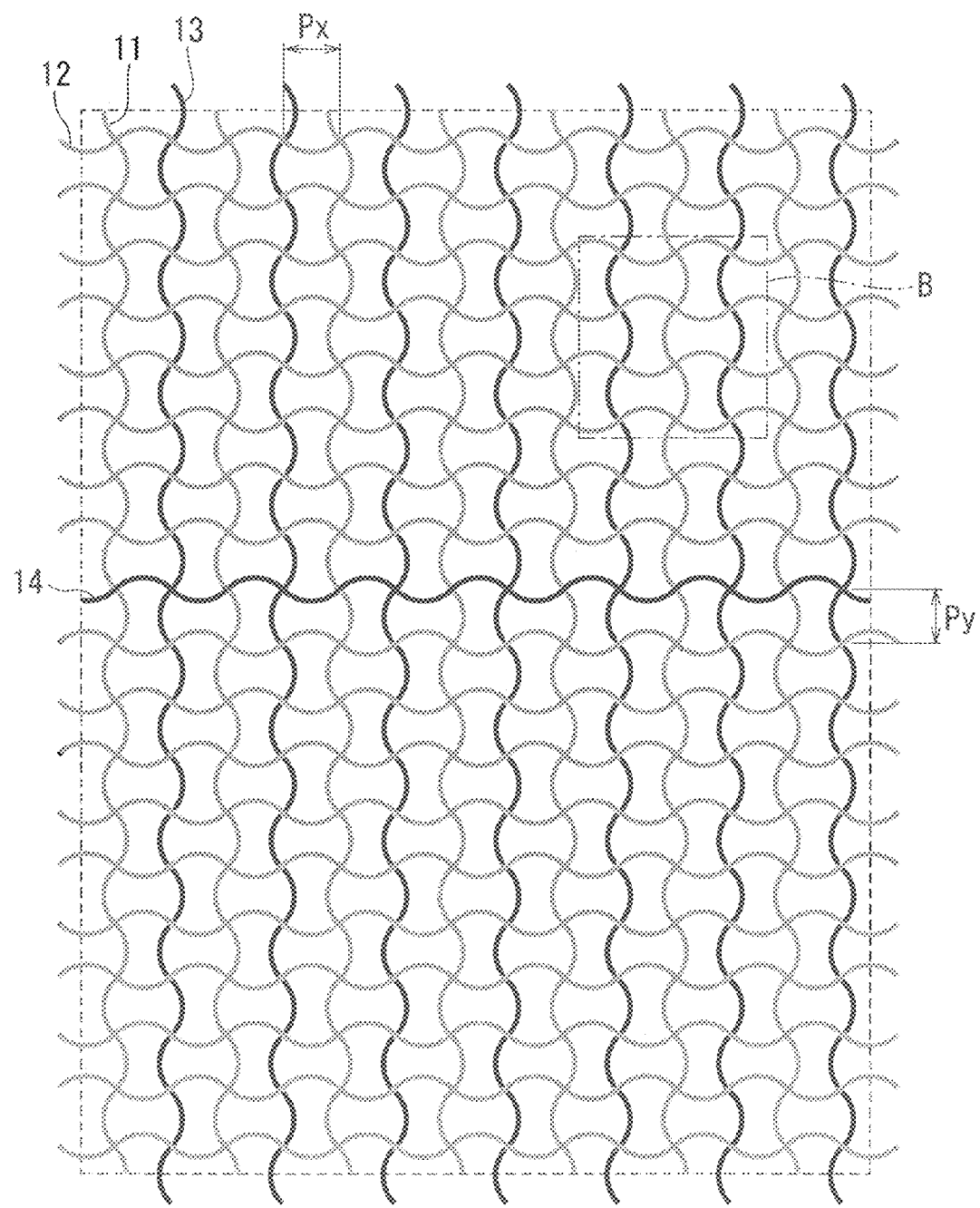
FIG. 11 is an enlarged view showing the row direction wire and the column direction wire in the region in which the row direction wire and the column direction wire overlap with each other in planar view according to the second preferred embodiment of the present invention.

FIG. 11 is an enlarged view showing the row direction wire 7 and the column direction wire 4 in the region in which the row direction wire 7 and the column direction wire 4 overlap with each other in planar view, illustrating a state in which FIGS. 9 and 10 are combined with each other. In FIG. 11, a region surrounded by a broken line corresponds to the region surrounded by the broken lines in FIGS. 9 and 10.

In the row direction of the mesh-like wire including the first row direction wire 11 and the first column direction wire 13, the first row direction wires 11 and the first column direction wires 13 are alternately provided at a regular interval (an interval Px). Herein, the interval Px is equivalent to an interval of a center line Ly (see FIG. 8) in adjacent wires (the first row direction wire 11 and the first column direction wire 13).

In the column direction of the mesh-like wire including the second row direction wire 12 and the second column direction wire 14, moreover, the second row direction wires 12 and the second column direction wires 14 are provided at a regular interval (an interval Py). Herein, the interval Py is equivalent to an interval of a center line Lx (see FIG. 8) in adjacent wires (the second row direction wire 12 and the second column direction wire 14).

Figure 12:
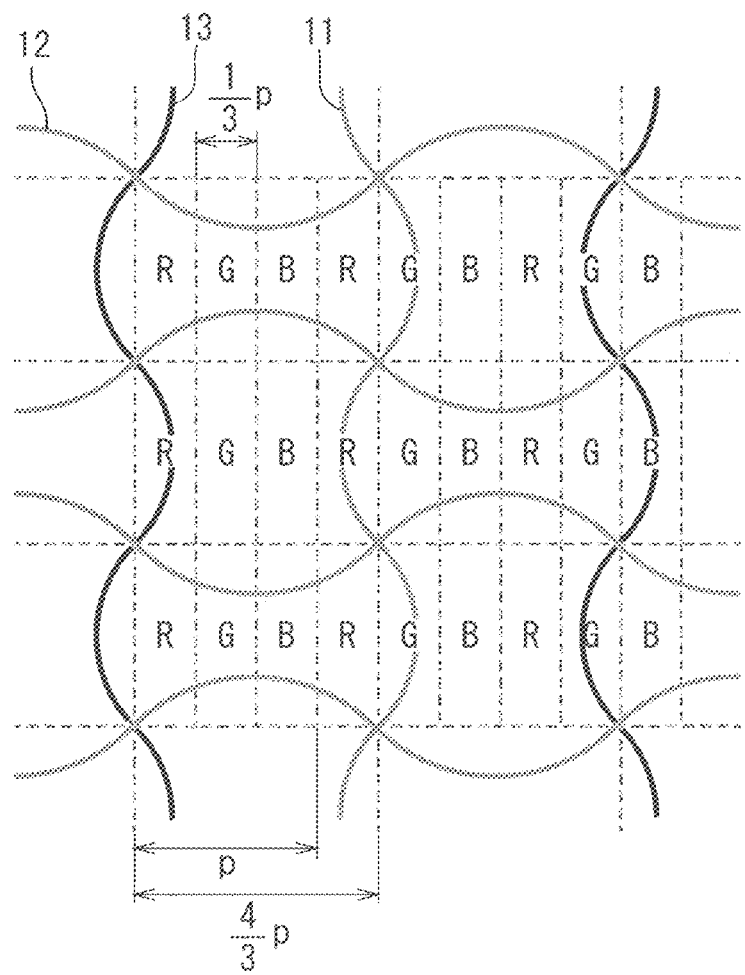
FIG. 12 is an enlarged view showing an example of a region B in FIG. 11.

FIG. 12 is an enlarged view showing an example of a region B in FIG. 11, illustrating a positional relationship of a pixel pattern in a liquid crystal panel to be attached to the touch screen 1 with the row direction wire 7 and the column direction wire 4.

For a pixel (a pitch of p) including respective sub-pixels (a pitch of p/3) of R, G and B in the row direction, the first row direction wire 11 and the first column direction wire 13 are disposed at an interval of 4p/3. Herein, the interval 4p/3 corresponds to the interval Px of FIG. 11.

In the second preferred embodiment, it is assumed that the first row direction wire 11, the second row direction wire 12, the first column direction wire 13, and the second column direction wire 14 have a width (a line width) of 3 μm, the interval Px in the row direction is 400 μm, and the interval Py in the column direction is 300 μm. Moreover, it is assumed that the pitch p of a pixel is 300 μm.

When the pitch of the pixel is decreased, moreover, the interval Px in the row direction is also reduced. In the same manner as in the first preferred embodiment, the interval of the arrangement of the first row direction wire 11 and the first column direction wire 13 is set to be (4/3+n)×p (n=1). Consequently, it is possible to obtain the same advantages as those in the case of the configuration in FIG. 11. At this time, it is desirable to select n in such a manner that the first row direction wire 11, the second row direction wire 12, the first column direction wire 13, and the second column direction wire 14 have constant widths and a total area of the first row direction wire 11, the second row direction wire 12, the first column direction wire 13, and the second column direction wire 14 is equal to or smaller than 1% of an area of a whole display area.

In order to confirm advantages according to the second preferred embodiment, the touch screen according to the second preferred embodiment (see FIG. 11) and the touch screen according to the first preferred embodiment (see FIG. 5) were visually observed in direct sunlight with an illuminance of 80000 lux. In the touch screen according to the second preferred embodiment, consequently, glare caused by reflected light of a wire was relieved. The reason is that the shape of the wire is set to be a curved shape and the reflected light is thus reflected in various directions. Although whether the color unevenness occurs was confirmed through visual observation by the same method as that in the first preferred embodiment, moreover, the color unevenness was not recognized visually.

From the foregoing, according to the second preferred embodiment, the shapes of the respective wires (the first row direction wire 11, the second row direction wire 12, the first column direction wire 13, and the second column direction wire 14) are set to be curved shapes. Therefore, a gradation is balanced (a reduction in a contrast ratio is prevented) so that the color unevenness can be suppressed. Moreover, it is possible to enhance an outdoor visibility.

By setting the row direction wire 7 and the column direction wire 4 to be the mesh-like wires, moreover, it is possible to form a wide detectable area with a small wire area.

The materials, line widths and arrangement interval of the row direction wire 7 and the column direction wire 4 are not restricted to the foregoing. For example, a transparent conductive material such as ITO or grapheme, or a metallic material such as aluminum, chromium, copper or silver may be used as the materials of the row direction wire 7 and the column direction wire 4. Moreover, it is also possible to employ alloys of aluminum, chromium, copper, silver or the like, or a multilayer structure in which aluminum nitride or the like is formed on any of these alloys. In addition, the line width and the interval can also have different values from the values described above depending on uses of the touch screen or the like.

Third Preferred Embodiment

Figure 13:
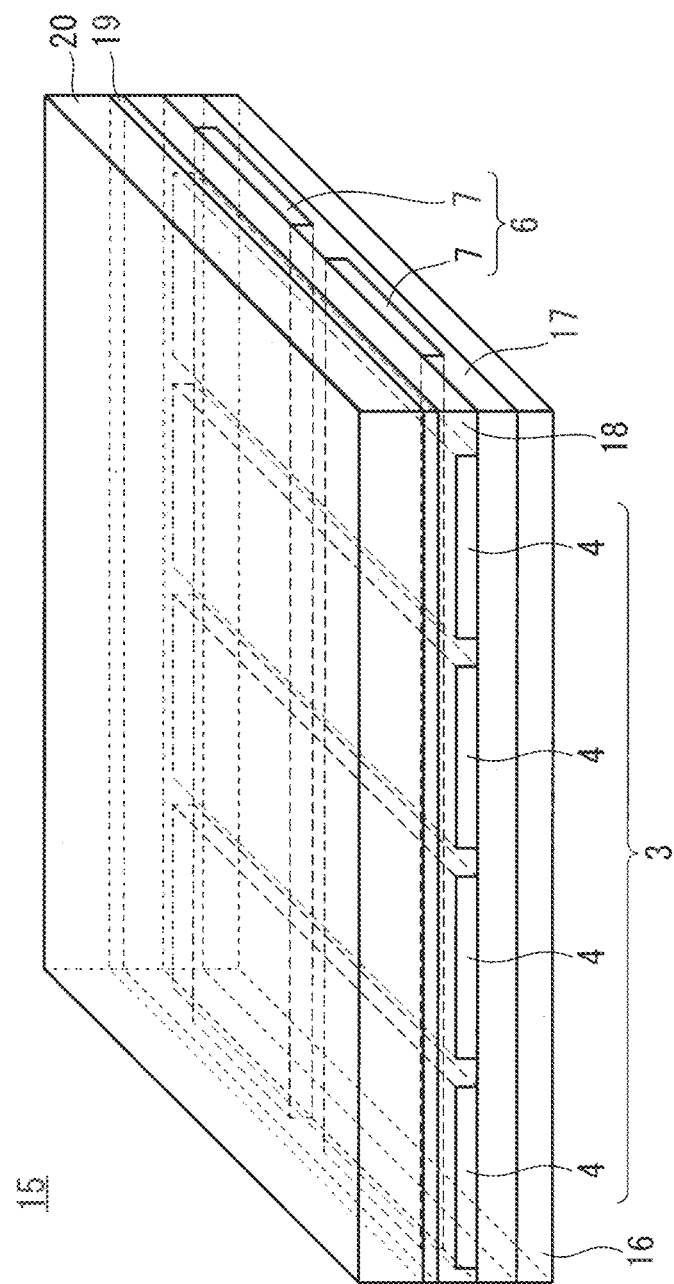
FIG. 13 is a perspective view showing an example of a configuration of a touch screen according to a third preferred embodiment of the present invention.

FIG. 13 is a perspective view showing an example of a configuration of a touch screen 15 according to a third preferred embodiment of the present invention. It is assumed that the touch screen 15 is a projected capacitive type touch screen.

A transparent substrate 16 formed of a transparent glass material or a transparent resin is provided as a lowermost layer of the touch screen 15. A lower electrode 6 is formed on the transparent substrate 16 and an interlayer insulating film 17 is formed to cover the lower electrode 6. The interlayer insulating film 17 is a transparent insulating film (having translucency) such as a silicon nitride film or a silicon oxide film.

An upper electrode 3 is formed on the interlayer insulating film 17 and a protective film 18 is formed to cover the upper electrode 3. The protective film 18 is a transparent insulating film such as a silicon nitride film or a silicon oxide film in the same manner as the interlayer insulating film 17.

A polarizing plate 19 for liquid crystal display for attaching the touch screen 15 is provided on (stuck onto) the protective film 18. In other words, the polarizing plate 19 is disposed on an opposite side to liquid crystal displays (display elements) of a row direction wire 7 and a column direction wire 4. Moreover, a transparent substrate 20 formed of a transparent glass material or a transparent resin is provided on (is caused to adhere onto) the polarizing plate 19 in order to protect the touch screen 15.

The lower electrode 6 has a plurality of row direction wires 7 formed of a transparent wire material such as ITO or a metallic wire material such as aluminum or copper. Moreover, the upper electrode 3 has a plurality of column direction wires 4 formed of a transparent wire material such as ITO or a metallic wire material such as aluminum or copper in the same manner as the row direction wires 7.

In the third preferred embodiment, the column direction wire 4 and the row direction wire 7 have a multilayer structure of an aluminum-based alloy layer and a nitride layer thereof. Therefore, it is possible to reduce a wire resistance and to enhance a transmittance of light in a detectable area.

Although the column direction wire 4 is disposed on an upper layer of the row direction wire 7 in the third preferred embodiment, the row direction wire 7 may be provided on an upper layer of the column direction wire 4. Alternatively, the column direction wire 4 and the row direction wire 7 may be disposed on the same layer, and the interlayer insulating film 17 may be disposed and electrically isolated in only a portion in which the column direction wire 4 and the row direction wire 7 overlap (intersect) with each other in planar view.

Although the column direction wire 4 and the row direction wire 7 have a multilayer structure of an aluminum-based alloy layer and a nitride layer thereof, the present invention is not restricted thereto. For example, the column direction wire 4 may have a multilayer structure of an aluminum-based alloy layer and a nitride layer thereof, and the row direction wire 7 may be formed of a transparent wire material such as ITO.

A user touches the transparent substrate 20 that is the surface of the touch screen 15 with an indicator such as a finger, thereby performing an operation. When the indicator touches the transparent substrate 20, capacitance coupling (touch capacitance) occurs between the indicator and the column direction wire 4 or the row direction wire 7. In the case of a self-capacitance detection method, it is possible to specify at which position inside a detectable area the transparent substrate 20 is touched by detecting the touch capacitance.

Since the plan view of the touch screen 15 shown in FIG. 13 is the same as FIG. 2, description will be omitted.

Next, the structures of the row direction wire 7 and the column direction wire 4 will be described with reference to FIGS. 14 to 17.

Figure 14:
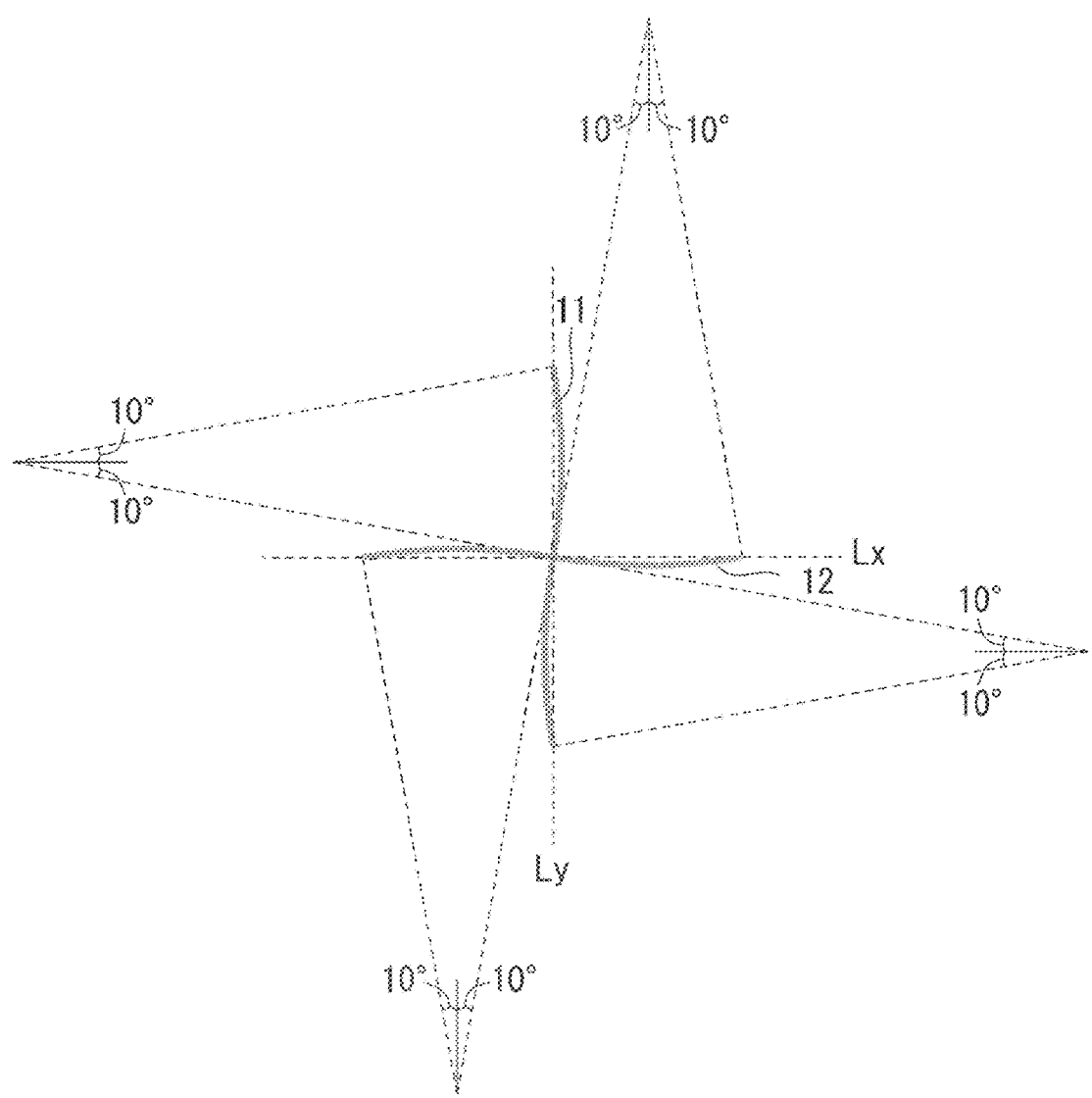
FIG. 14 is a view showing an example of a shape of a row direction wire according to the third preferred embodiment of the present invention.

FIG. 14 is a view showing an example of shapes of a first row direction wire 11 and a second row direction wire 12 according to the third preferred embodiment. It is assumed that a polarizing axis of the polarizing plate 19 is parallel with a column direction (an axis Ly of FIG. 14).

The first row direction wire 11 and the second row direction wire 12 are provided like a circular arc (a curved shape) in such a manner that a tangential line passing through an intersection point of the first row direction wire 11 and the second row direction wire 12 has an inclination of 10 degrees or less with respect to the polarizing axis of the polarizing plate 19. In other words, the first row direction wire 11 and the second row direction wire 12 are provided in a meandering form. Moreover, respective circular arcs (four circular arcs in FIG. 14) are provided at a circumferential angle of 20 degrees along a center line Lx or Ly.

Although the first row direction wire 11 and the second row direction wire 12 have been described above, the first column direction wire 13 and the second column direction wire 14 are also the same.

Figure 15:
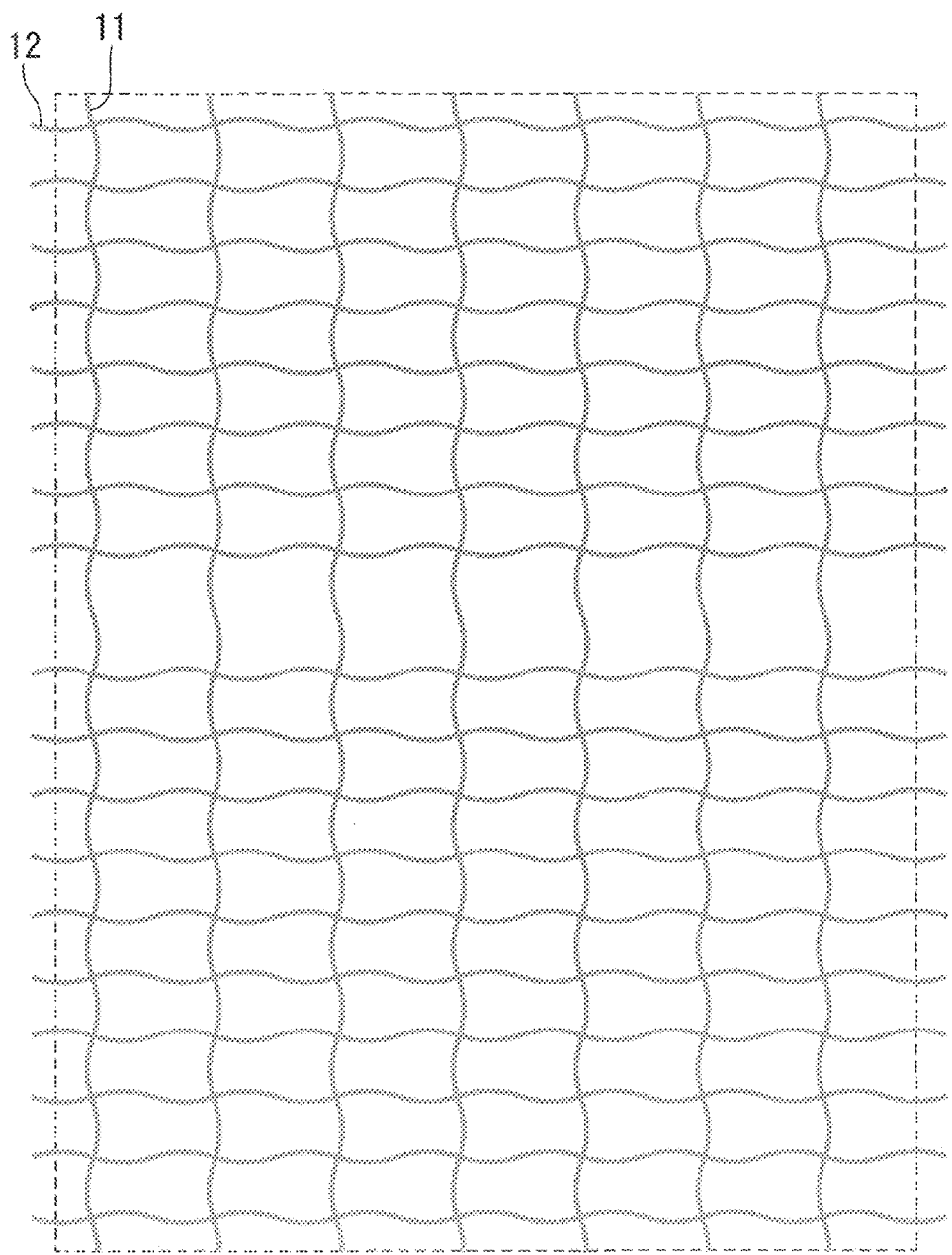
FIG. 15 is an enlarged view showing a row direction wire in a region in which the row direction wire and a column direction wire overlap with each other in planar view according to the third preferred embodiment of the present invention.

FIG. 15 is an enlarged view showing the row direction wire 7 in the region in which the row direction wire 7 and the column direction wire 4 overlap with each other in planar view (see FIG. 2). In FIG. 15 a region surrounded by a broken line indicates a region in which the row direction wire 7 and the column direction wire 4 overlap with each other in planar view.

The first row direction wires 11 are formed in a curved shape (formed with the shape of FIG. 14 taken continuously) and are provided at a regular interval in the row direction. Herein, the first row direction wire 11 is extended substantially in a column direction. Although the second row direction wires 12 are formed in a curved shape (formed with the shape of FIG. 14 taken continuously) and are provided at a regular interval in the column direction, moreover, the column direction wires 4 are not disposed in a central part of the region in which the row direction wire 7 and the column direction wire 4 overlap with each other in planar view. Specifically, the second row direction wire 12 corresponding to a single wire is not provided in the central part.

Figure 16:
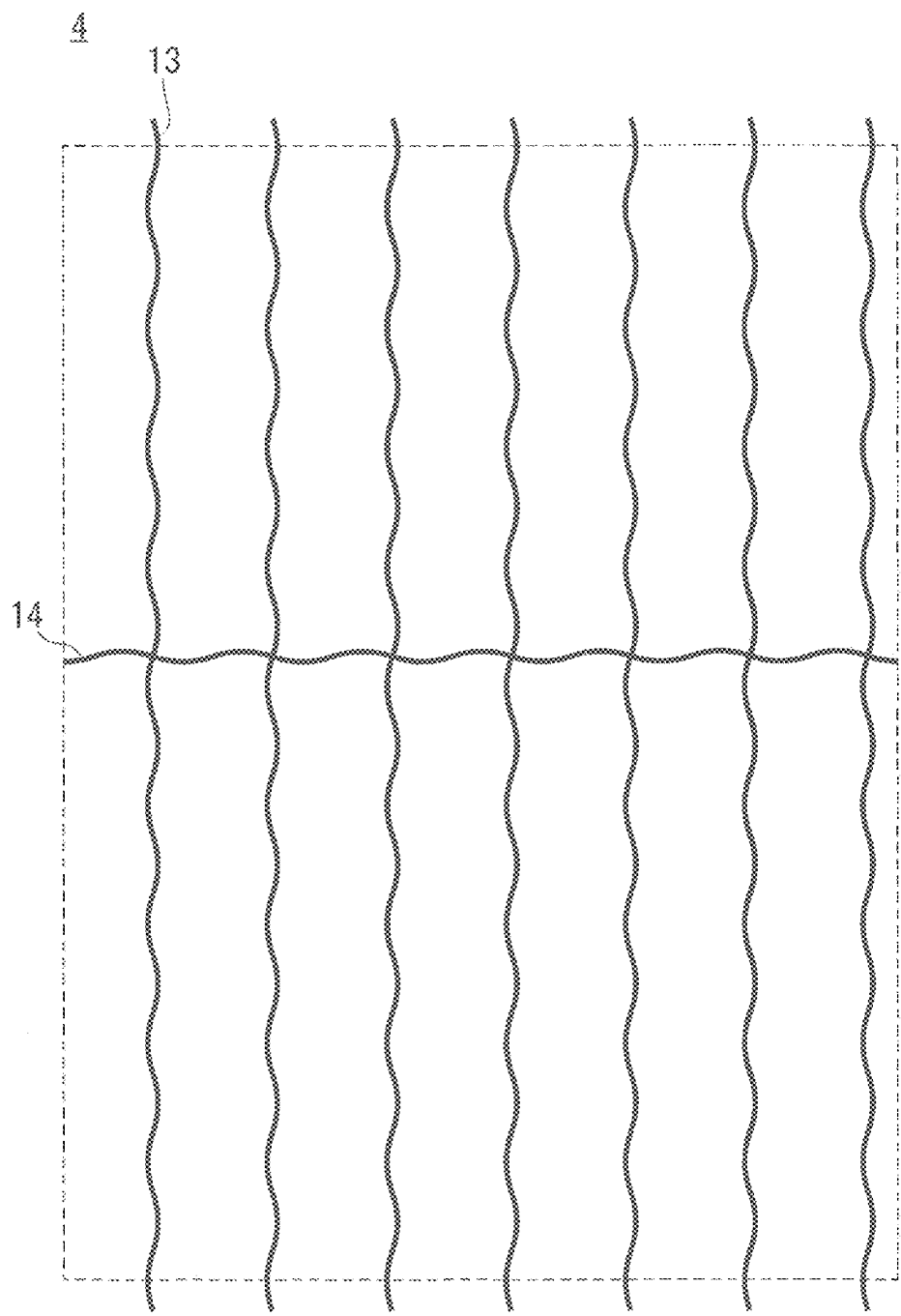
FIG. 16 is an enlarged view showing the column direction wire in the region in which the row direction wire and the column direction wire overlap with each other in planar view according to the third preferred embodiment of the present invention.

FIG. 16 is an enlarged view showing the column direction wire 4 in the region in which the row direction wire 7 and the column direction wire 4 overlap with each other in planar view. In FIG. 16, a region surrounded by a broken line corresponds to the region surrounded by the broken line in FIG. 15.

The first column direction wires 13 are formed in a curved shape (formed with the shape of FIG. 14 taken continuously) and are provided at a regular interval in the row direction. Herein, the first row direction wire 13 is extended substantially in the column direction. Moreover, the second column direction wires 14 are formed in a curved shape (formed with the shape of FIG. 14 taken continuously) and are disposed in the central part of the region in which the row direction wire 7 and the column direction wire 4 overlap with each other in planar view.

Figure 17:
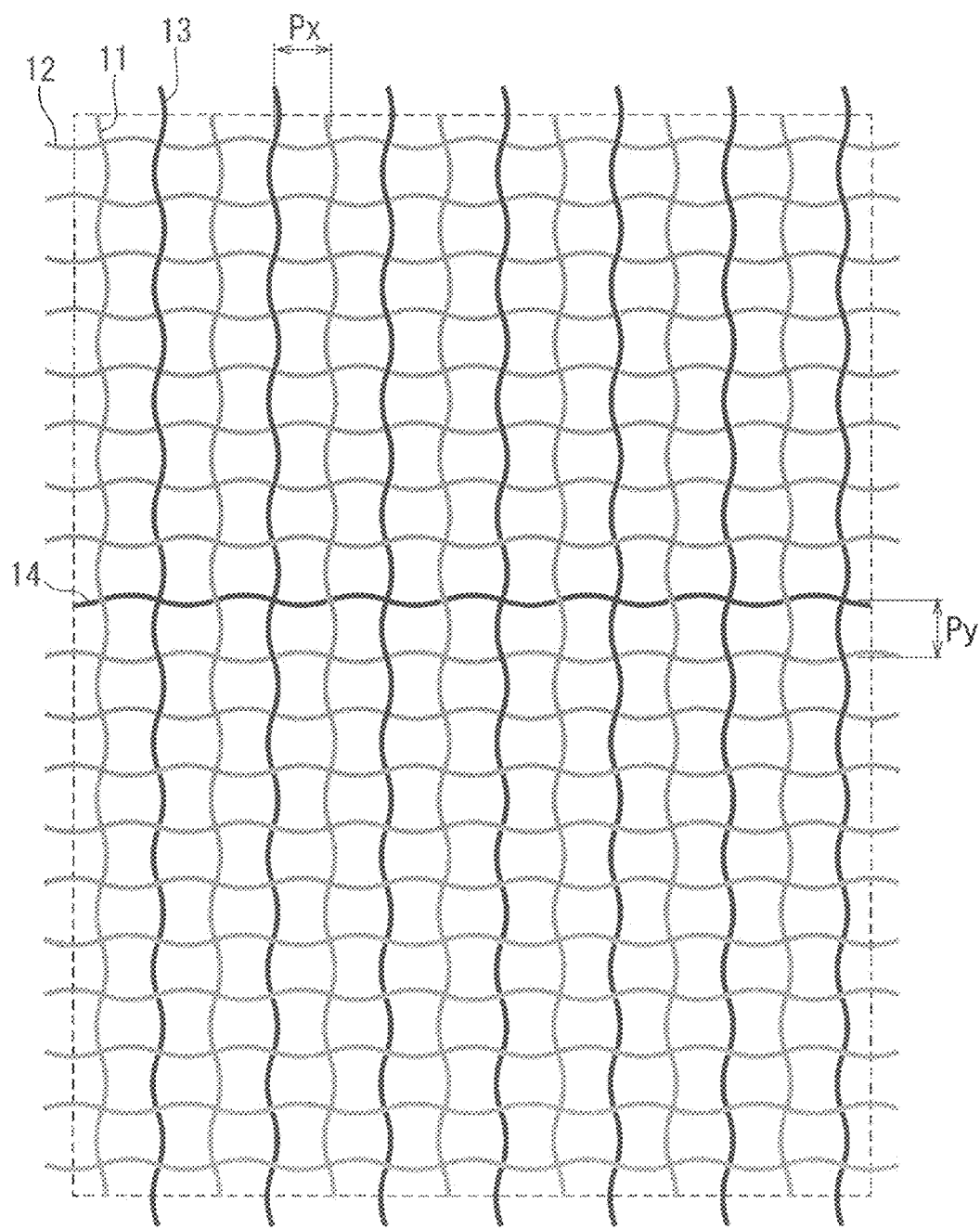
FIG. 17 is an enlarged view showing the row direction wire and the column direction wire in the region in which the row direction wire and the column direction wire overlap with each other in planar view according to the third preferred embodiment of the present invention.

FIG. 17 is an enlarged view showing the row direction wire 7 and the column direction wire 4 in the region in which the row direction wire 7 and the column direction wire 4 overlap with each other in planar view, illustrating a state in which FIGS. 15 and 16 are combined with each other. In FIG. 17, a region surrounded by a broken line corresponds to the region surrounded by the broken lines in FIGS. 15 and 16.

In the row direction of the mesh-like wire including the first row direction wire 11 and the first column direction wire 13, the first row direction wires 11 and the first column direction wires 13 are alternately provided at a regular interval (an interval Px). Herein, the interval Px is equivalent to an interval of a center line Ly (see FIG. 14) in adjacent wires (the first row direction wire 11 and the first column direction wire 13).

In the column direction of the mesh-like wire including the second row direction wire 12 and the second column direction wire 14, moreover, the second row direction wire 12 and the second column direction wire 14 are provided at a regular interval (an interval Py). Herein, the interval Py is equivalent to an interval of a center line Lx (see FIG. 14) in adjacent wires (the second row direction wire 12 and the second column direction wire 14).

By setting the interval Px to be 4/3 times as great as a pitch of a pixel in the same manner as in the first and second preferred embodiments, it is possible to suppress color unevenness.

In the third preferred embodiment, it is assumed that the first row direction wire 11, the second row direction wire 12, the first column direction wire 13, and the second column direction wire 14 have a width (a line width) of 3 μm, the interval Px in the row direction is 400 μm and the interval Py in the column direction is 300 μm. Moreover, it is assumed that a pitch p of a pixel is 300 μm.

When a pitch of a pixel is decreased, moreover, the interval Px in the row direction is also reduced. By setting an arrangement interval between the first row direction wire 11 and the first column direction wire 13 to be $(4/3+n) \times p$ (n=1) in the same manner as in the first and second preferred embodiments, it is possible to obtain the same advantages as those in the case of the configuration in FIG. 17. In this case, it is desirable to select n in such a manner that the first row direction wire 11, the second row direction wire 12, the first column direction wire 13, and the second column direction wire 14 have constant widths and a total area of the first row direction wire 11, the second row direction wire 12, the first column direction wire 13, and the second column direction wire 14 is equal to or smaller than 1% of an area of a whole display area.

In order to confirm advantages according to the second preferred embodiment, the touch screen according to the third preferred embodiment (see FIG. 17) and the touch screen according to the first preferred embodiment (see FIG. 5) were visually observed in direct sunlight with an illuminance of 80000 lux. In the touch screen according to the third preferred embodiment, consequently, glare caused by reflected light of a wire was relieved. The reason is that the shape of the wire is set to be a curved shape and the reflected light is thus reflected in various directions. Although whether the color unevenness occurs was confirmed through visual observation by the same method as that in the first preferred embodiment, moreover, the color unevenness was not recognized visually.

Moreover, the touch screen according to the third preferred embodiment is attached onto a liquid crystal panel to measure a contrast ratio. Consequently, the contrast ratio in the case where the touch screen according to the third preferred embodiment is attached onto a liquid crystal panel was almost equal to a contrast ratio of a liquid crystal panel having no touch screen attached thereto. On the other hand, a contrast ratio in the case where the touch screen according to the second preferred embodiment (see FIG. 11) is attached to the liquid crystal panel was decreased by approximately 20% with respect to the contrast ratio of the liquid crystal panel having no touch screen attached thereto. The touch screen according to the second preferred embodiment is a curved wire having an inclination of 10 degrees or more with respect to the polarizing axis. For this reason, the polarizing axis of light through the polarizing plate on a back light side of a liquid crystal display is varied so that light leaks in black display.

From the foregoing, according to the third preferred embodiment, the row direction wire 7 and the column direction wire 4 are provided to have an inclination of 10 degrees or less with respect to the polarizing axis of the polarizing plate. Therefore, it is possible to eliminate a luminous part in black display on the liquid crystal display. Even if the polarizing plate 19 is disposed closer to a display surface side of the liquid crystal display than the touch screen 15, accordingly, it is possible to prevent a contrast ratio from being reduced in addition to a prevention of color unevenness and an enhancement in an outdoor visibility.

By setting the row direction wire 7 and the column direction wire 4 to be the mesh-like wires, moreover, it is possible to form a wide detectable area with a small wire area.

The materials, line widths and arrangement interval of the row direction wire 7 and the column direction wire 4 are not restricted to the foregoing. For example, a transparent conductive material such as ITO or grapheme, or a metallic material such as aluminum, chromium, copper or silver may be used as the materials of the row direction wire 7 and the column direction wire 4. Moreover, it is also possible to employ alloys of aluminum, chromium, copper, silver or the like, or a multilayer structure in which aluminum nitride or the like is formed on any of these alloys. In addition, the line width and the interval can also have different values from the values described above depending on uses of a touch screen or the like.

Fourth Preferred Embodiment

In the first preferred embodiment, the description has been given of the case where the first row direction wire 11 and the first column direction wire 13 are provided in a parallel direction with the longitudinal direction of the sub-pixel. In the first preferred embodiment, when the black matrix pattern is disposed in a parallel direction with the first row direction wire 11 and the first column direction wire 13, the first row direction wire 11 and the first column direction wire 13 perfectly overlap with the black matrix pattern in planar view. When the user sees the screen in an oblique direction, therefore, there are distributed a region in which a wire intercepts light transmitted through the sub-pixel and a region in which the wire does not perfectly intercept the light transmitted through the sub-pixel. For this reason, a stripe-shaped light and shade pattern tends to be generated.

The fourth preferred embodiment according to the present invention has a feature that a first row direction wire 11 and a first column direction wire 13 are provided to have an inclination of 10 degrees or less with respect to a polarizing axis of a polarizing plate. Since the other configurations are the same as those in the third preferred embodiment, description will be omitted.

Structures of a row direction wire 7 and a column direction wire 4 will be described with reference to FIGS. 18 to 22. In FIGS. 18 to 22, a transverse direction of the paper is set to be a row direction and a vertical direction of the paper is set to be a column direction. Moreover, FIGS. 18 to 22 schematically show wire patterns of the row direction wire 7 and the column direction wire 4, and thicknesses of the wires and arrangement intervals between the wires are different from an actual situation. Furthermore, it is assumed that a longitudinal direction of a sub-pixel of a liquid crystal panel to be attached to a touch screen is parallel with the column direction in FIGS. 18 to 22.

Figure 18:
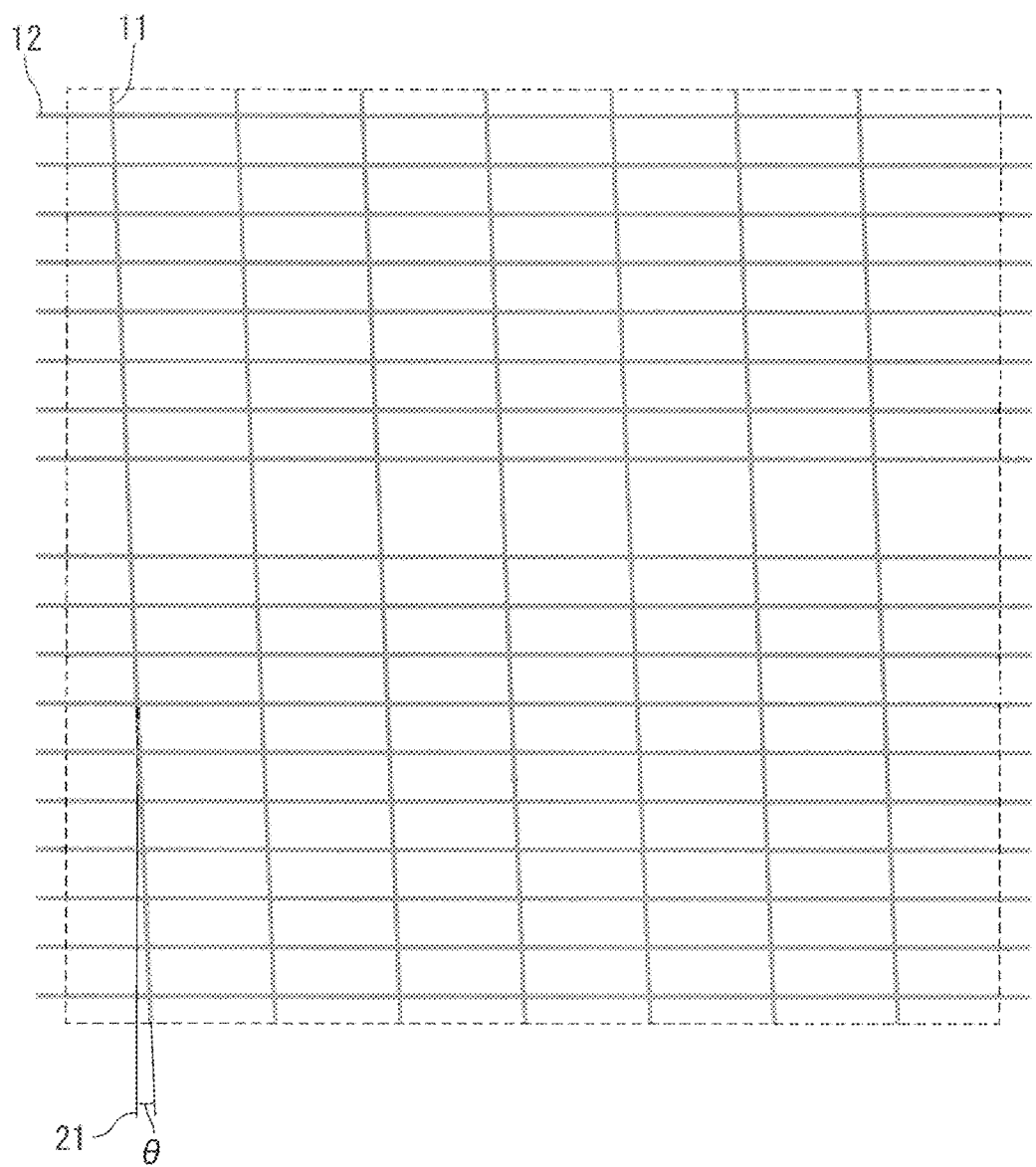
FIG. 18 is an enlarged view showing a row direction wire in a region in which the row direction wire and a column direction wire overlap with each other in planar view according to a fourth preferred embodiment of the present invention.

FIG. 18 is an enlarged view showing the row direction wire 7 in the region in which the row direction wire 7 and the column direction wire 4 overlap with each other in planar view (see FIG. 2). In FIG. 18, a region surrounded by a broken line indicates a region in which the row direction wire 7 and the column direction wire 4 overlap with each other in planar view (see FIG. 2).

The first row direction wires 11 each have an inclination of an angle θ of 10 degrees or less with respect to a polarizing axis 21 of a polarizing plate 19, and are provided at a regular interval in the row direction. Herein, the first row direction wire 11 is extended substantially in the column direction. Although the second row direction wires 12 are provided at a regular interval in the column direction, moreover, the second row direction wires are not disposed in a central part of the region in which the row direction wire 7 and the column direction wire 4 overlap with each other in planar view. Specifically, the second row direction wire 12 corresponding to a single wire is not provided in the central part.

Figure 19:
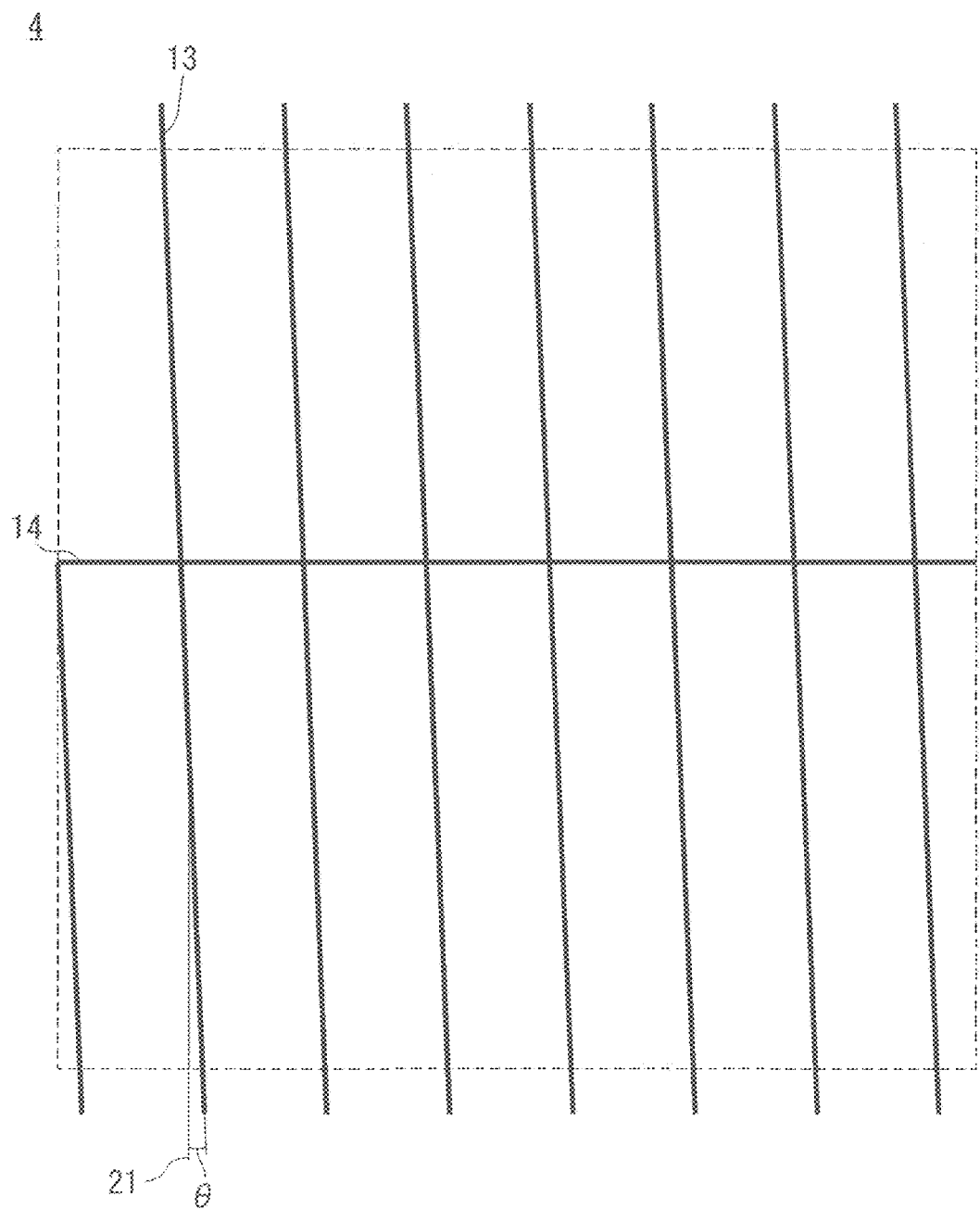
FIG. 19 is an enlarged view showing the column direction wire in the region in which the row direction wire and the column direction wire overlap with each other in planar view according to the fourth preferred embodiment of the present invention.

FIG. 19 is an enlarged view showing the column direction wire 4 in the region in which the row direction wire 7 and the column direction wire 4 overlap with each other in planar view. In FIG. 4, a region surrounded by a broken line corresponds to the region surrounded by the broken line in FIG. 18.

The first column direction wires 13 each have an inclination of an angle θ of 10 degrees or less with respect to the polarizing axis 21 of the polarizing plate 19, and are provided at a regular interval in the row direction. Herein, the first column direction wire 13 is extended substantially in the column direction. Moreover, the second column direction wire 14 is disposed in the central part of the region in which the row direction wire 7 and the column direction wire 4 overlap with each other in planar view.

Figure 20:
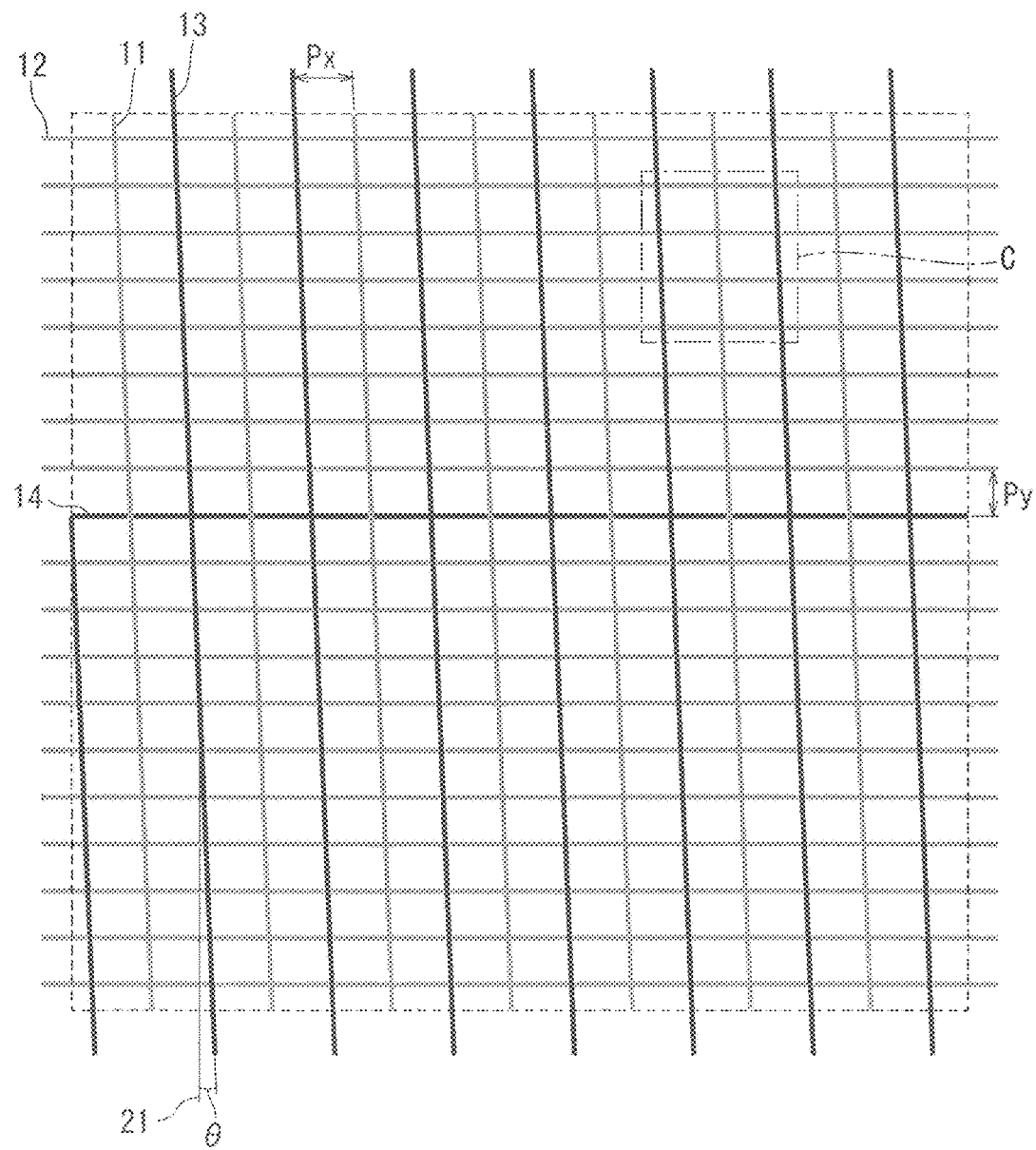
FIG. 20 is an enlarged view showing the row direction wire and the column direction wire in the region in which the row direction wire and the column direction wire overlap with each other in planar view according to the fourth preferred embodiment of the present invention.

FIG. 20 is an enlarged view showing the row direction wire 7 and the column direction wire 4 in the region in which the row direction wire 7 and the column direction wire 4 overlap with each other in planar view, illustrating a state in which FIGS. 18 and 19 are combined with each other. In FIG. 20, a region surrounded by a broken line corresponds to the region surrounded by the broken lines in FIGS. 18 and 19.

In the row direction of the mesh-like wire including the first row direction wire 11 and the first column direction wire 13, the first row direction wires 11 and the first column direction wires 13 are alternately provided at a regular interval (an interval Px).

In the column direction of the mesh-like wire including the second row direction wire 12 and the second column direction wire 14, moreover, the second row direction wires 12 and the second column direction wires 14 are provided at a regular interval (an interval Py).

Figure 21:
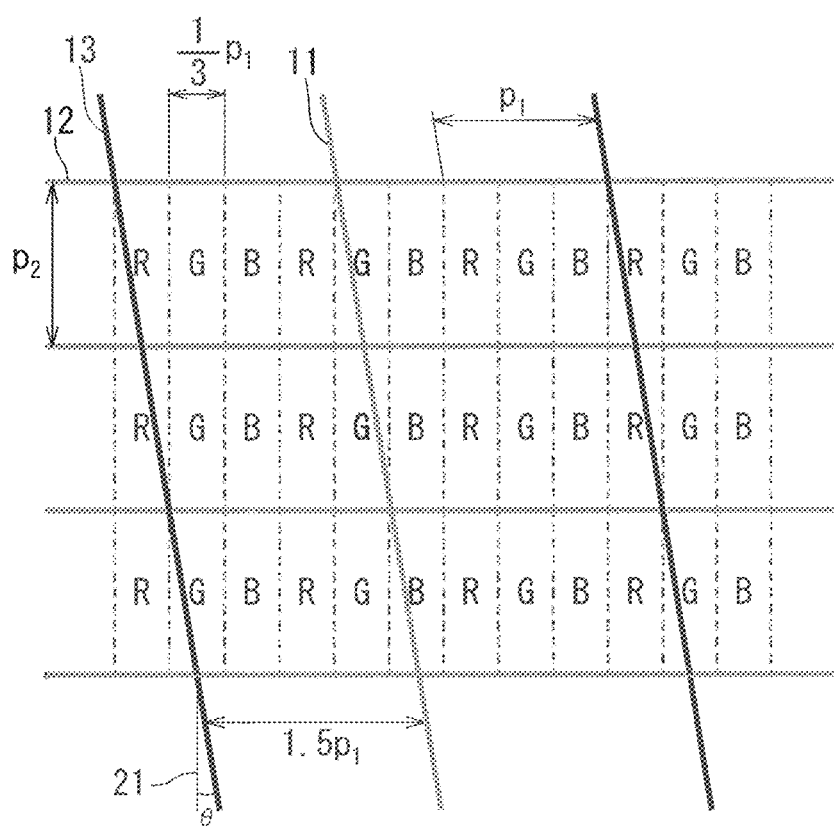
FIG. 21 is an enlarged view showing an example of a region C in FIG. 20.
Figure 22:
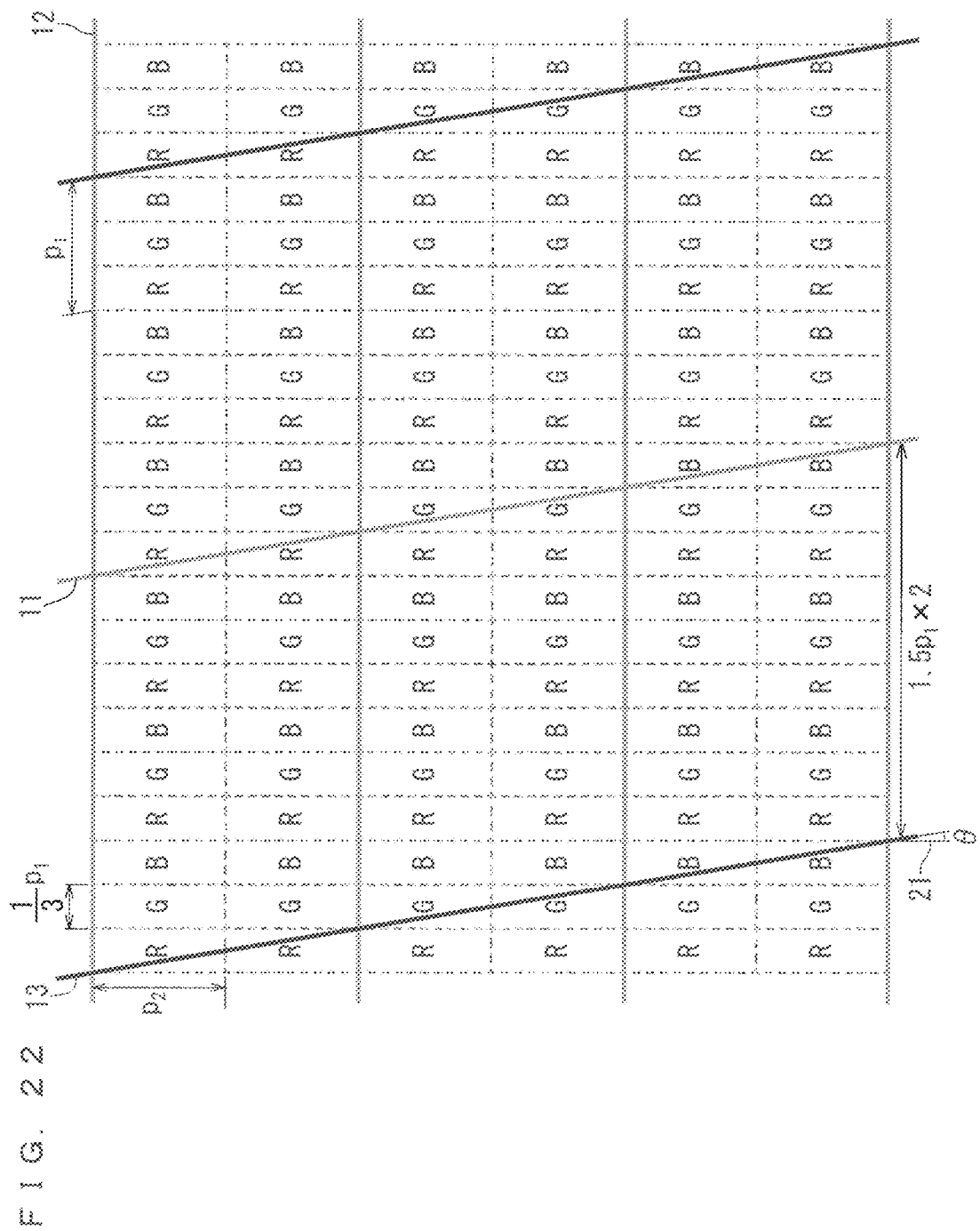
FIG. 22 is an enlarged view showing another example of the region C in FIG. 20.

FIG. 21 is an enlarged view showing an example of a region C in FIG. 20, illustrating a positional relationship of a pixel pattern in the liquid crystal panel to be attached to the touch screen 15 with the row direction wire 7 and the column direction wire 4.

The first row direction wire 11 and the first column direction wire 13 are disposed at an interval of 1.5 $p_1$ with respect to a pixel (a pitch in the row direction is $p_1$ and a pitch in the column direction is $p_2$) including respective sub-pixels of R, G and B in the row direction (a pitch in the row direction is $p_1/3$). Herein, the interval 1.5$p_1$ corresponds to the interval Px of FIG. 20. Moreover, the following equations (1) and (2) are satisfied, wherein an angle formed by the first row direction wire 11 and the first column direction wire 13 and the polarizing axis 21 is represented by θ.

$$Px = \tan\theta = p_1/6p_2 \qquad (1)$$

$$\tan^{-1}(p_1/6p_2) \leq \pi/18 \qquad (2)$$

By the arrangement described above, when the user sees the screen in an oblique direction, the first row direction wire 11 and the first column direction wire 13 evenly block the respective regions of the sub-pixels R, G and B. Therefore, a gradation is balanced so that color unevenness can be suppressed.

In the first preferred embodiment, it is assumed that the first row direction wire 11, the second row direction wire 12, the first column direction wire 13, and the second column direction wire 14 have a width (a line width) of 3 μm, the interval Px in the row direction is 400 μm and the interval Py in the column direction is 300 μm. Moreover, it is assumed that the pitch $p_1$ of a pixel is 300 μm. It is sufficient that an interval between the first row direction wire 11 and the first column direction wire 13 is 1.5 $np_1$ (n is a positive integer which is greater than zero).

In order to confirm advantages according to the fourth preferred embodiment, the touch screen 1 having the wire structure shown in FIG. 21 was attached to the liquid crystal panel and whether the color unevenness occurs in a state of white display was visually observed. However, the color unevenness was not recognized visually.

Moreover, the touch screen according to the fourth preferred embodiment is attached onto the liquid crystal panel to measure a contrast ratio. Consequently, the contrast ratio in the case where the touch screen according to the fourth preferred embodiment is attached onto the liquid crystal panel was almost equal to a contrast ratio of a liquid crystal panel having no touch screen attached thereto. On the other hand, a contrast ratio in the case where the touch screen according to the second preferred embodiment (see FIG. 11) is attached to the liquid crystal panel was decreased by approximately 20% with respect to the contrast ratio of the liquid crystal panel having no touch screen attached thereto.

Moreover, each of the touch screen according to the fourth preferred embodiment and the touch screen according to the first preferred embodiment was provided on the liquid crystal panel having a black matrix pattern formed in parallel with the column direction and the row direction to visually confirm display. Consequently, a stripe-shaped light and shade pattern was visually recognized in the touch panel screen according to the first preferred embodiment. In the touch screen according to the fourth preferred embodiment, however, the stripe-shaped light and shade pattern was not recognized visually.

From the foregoing, according to the fourth preferred embodiment, the first row direction wire 11 and the first column direction wire 13 are provided with an inclination of 10 degrees or less with respect to the polarizing axis 21 of the polarizing plate. Therefore, the gradation is balanced (the reduction in the contrast ratio is prevented) so that the color unevenness can be suppressed and the stripe-shaped light and shade pattern can be prevented from being recognized visually.

By setting the row direction wire 7 and the column direction wire 4 to be the mesh-like wires, moreover, it is possible to form a wide detectable area with a small wire area.

The materials, line widths and arrangement interval of the row direction wire 7 and the column direction wire 4 are not restricted to the foregoing. For example, a transparent conductive material such as ITO or grapheme, or a metallic material such as aluminum, chromium, copper or silver may be used as the materials of the row direction wire 7 and the column direction wire 4. Moreover, it is also possible to employ alloys of aluminum, chromium, copper, silver or the like, or a multilayer structure in which aluminum nitride or the like is formed on any of these alloys. In addition, the line width and the interval can also have different values from the values described above depending on uses of a touch screen or the like.

Fifth Preferred Embodiment

In the first preferred embodiment, the description has been given of the case where the liquid crystal panel having such a structure that the respective sub-pixels of R, G and B are disposed in the row direction is attached to the touch screen. The fifth preferred embodiment according to the present invention has a feature that a liquid crystal panel with a triple gate structure having the respective sub-pixels of R, G and B disposed in a column direction is attached to a touch screen. Since the other configurations are the same as those in the first preferred embodiment, description will be omitted.

FIG. 23 is an enlarged view showing a row direction wire 7 and a column direction wire 4 in a region in which the row direction wire 7 and the column direction wire 4 overlap with each other in planar view according to the fifth preferred embodiment.

In comparison with the first preferred embodiment (see FIG. 6), an interval in a row direction of FIG. 23 corresponds to the interval in the column direction of FIG. 6. Moreover, an interval in a column direction of FIG. 23 corresponds to the interval in the row direction of FIG. 6. In other words, a longitudinal direction of a sub-pixel of the liquid crystal panel to be attached to the touch screen is parallel with the column direction of FIG. 23. The others (a relationship between pitches or the like) are the same as those in the first preferred embodiment.

From the foregoing, according to the fifth preferred embodiment, the same advantages as those in the first preferred embodiment can be obtained also in the case where the liquid crystal panel having the triple gate structure is attached to the touch screen.

Although the above description has been given of the case where the liquid crystal panel having the triple gate structure is employed in the first preferred embodiment, it is also possible to employ the liquid crystal panel having the triple gate structure in the second to fourth preferred embodiments. In this case, it is possible to obtain the same advantages as those in each of the second to fourth preferred embodiments.

Sixth Preferred Embodiment

Figure 24:
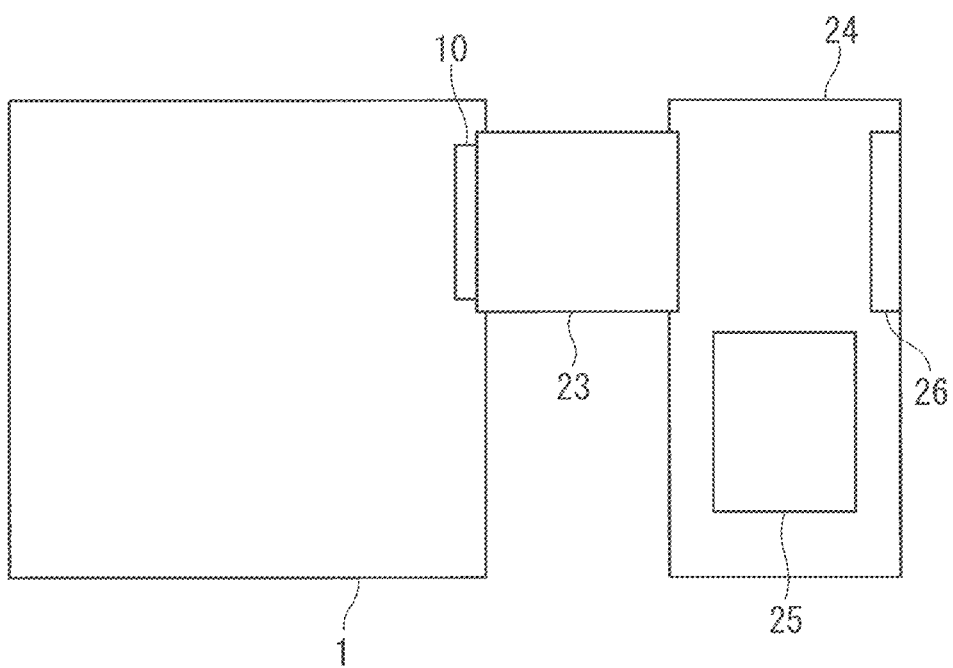
FIG. 24 is a plan view schematically showing an example of a configuration of a touch panel according to a preferred embodiment of the present invention.

FIG. 24 is a plan view schematically showing an example of a configuration of a touch panel 22 according to a sixth preferred embodiment of the present invention.

The touch panel 22 includes the touch screen 1 according to the first preferred embodiment shown in FIG. 1, a flexible printed circuit board 23, and a controller board 24.

The flexible printed circuit board 23 is connected to a terminal 9 of the touch screen 1. The flexible printed circuit board 23 has a terminal (which corresponds to the terminal 9) mounted by using an anisotropic conductive film or the like. By electrically connecting a column direction wire 4 and a row direction wire 7 in the touch screen 1 to the controller board 24 through the flexible printed circuit board 23, the touch screen 1 functions as a main component of the touch panel 22.

The controller board 24 is provided with a detection processing circuit 25 (a touch position detection circuit). The detection processing circuit 25 detects a touch capacitance constituted by an electrostatic capacitance generated between an indicator and the column direction wire 4 or row direction wire 7 through application of a signal voltage and performs processing for calculating a touch position of the indicator in the touch screen 1 based on a result of the detection. In other words, the detection processing circuit 25 detects a position on the touch screen 1 indicated by the indicator for indicating the touch screen 1 based on the electrostatic capacitance between the indicator and the row direction wire 7 and column direction wire 4.

The detection processing circuit 25 can employ a projected capacitive type detection logic. Moreover, the controller board 24 includes an external connecting terminal 26 for outputting, to an external processing device, a touch position calculated by the detection processing circuit 25.

From the foregoing, according to the sixth preferred embodiment, the touch panel 22 includes the touch screen 1 (see FIG. 1) according to the first preferred embodiment. In the case where the touch panel 22 is attached to a liquid crystal display, consequently, it is possible to obtain the touch panel 22 suppressing a reduction in a contrast.

Although the above description has been given of the case where the touch screen according to the first preferred embodiment is used, the present invention is not restricted thereto. For example, the same advantages can be obtained even if the touch screens according to the second to fifth preferred embodiments are used.

Moreover, the detection processing circuit 25 is not always mounted on the controller board 24 but may be mounted on a transparent substrate 2 of the touch screen 1.

Seventh Preferred Embodiment

A display device according to a seventh preferred embodiment of the present invention has such a feature as to include the touch panel 22 according to the sixth preferred embodiment (see FIG. 24) and a liquid crystal display element capable of displaying information (an LCD which is not shown).

The touch panel 22 is disposed on a user side from a display screen of the liquid crystal display element. In other words, the liquid crystal display element is disposed on an opposite side to a side, where the touch screen is indicated, with respect to the touch panel 22. By such a configuration, a display device with a touch panel can have a function for detecting a touch position indicated by the user.

From the foregoing, according to the seventh preferred embodiment, it is possible to obtain a display device with a projected capacitive type touch panel which is outstanding visibility.

Eighth Preferred Embodiment

An electronic device according to an eighth preferred embodiment of the present invention has such a feature as to include the touch panel 22 according to the sixth preferred embodiment (see FIG. 24) and a signal processing element that is an electronic element (an electronic processor which is not shown).

The signal processing element inputs a signal output from an external connecting terminal 26 of the touch panel 22 and outputs the signal as a digital signal. In other words, the signal processing element electronically performs predetermined processing over information about a touch position detected by the detection processing circuit 25 of the touch panel 22. By a configuration for connecting the signal processing element to the touch panel 22, thus, it is possible to set the electronic device having a touch position detecting function such as a digitizer which outputs, to an external signal processing device such as a computer, information about the touch position detected by the detection processing circuit 25 of the touch panel 22.

The signal processing element may be built in (mounted on) a controller board 24 of the touch panel 22. In this case, the signal processing element has such an output function as to satisfy a bus standard such as Universal Serial Bus (USB), thereby enabling implementation of the electronic device with a touch position detecting function having a high versatility.

From the foregoing, according to the eighth preferred embodiment, it is possible to obtain an electronic device that has outstanding visibility and has the projected-capacitive type touch position detection function.

In the first to fifth preferred embodiments, the description has been given, as an example, of the case where the black matrix pattern is formed by the parallel pattern with the column direction and the row direction. However, it is also possible to use a dogleg-shaped black matrix pattern which is often employed in an In Plane Switching (IPS) type or the like.

Figure 25:
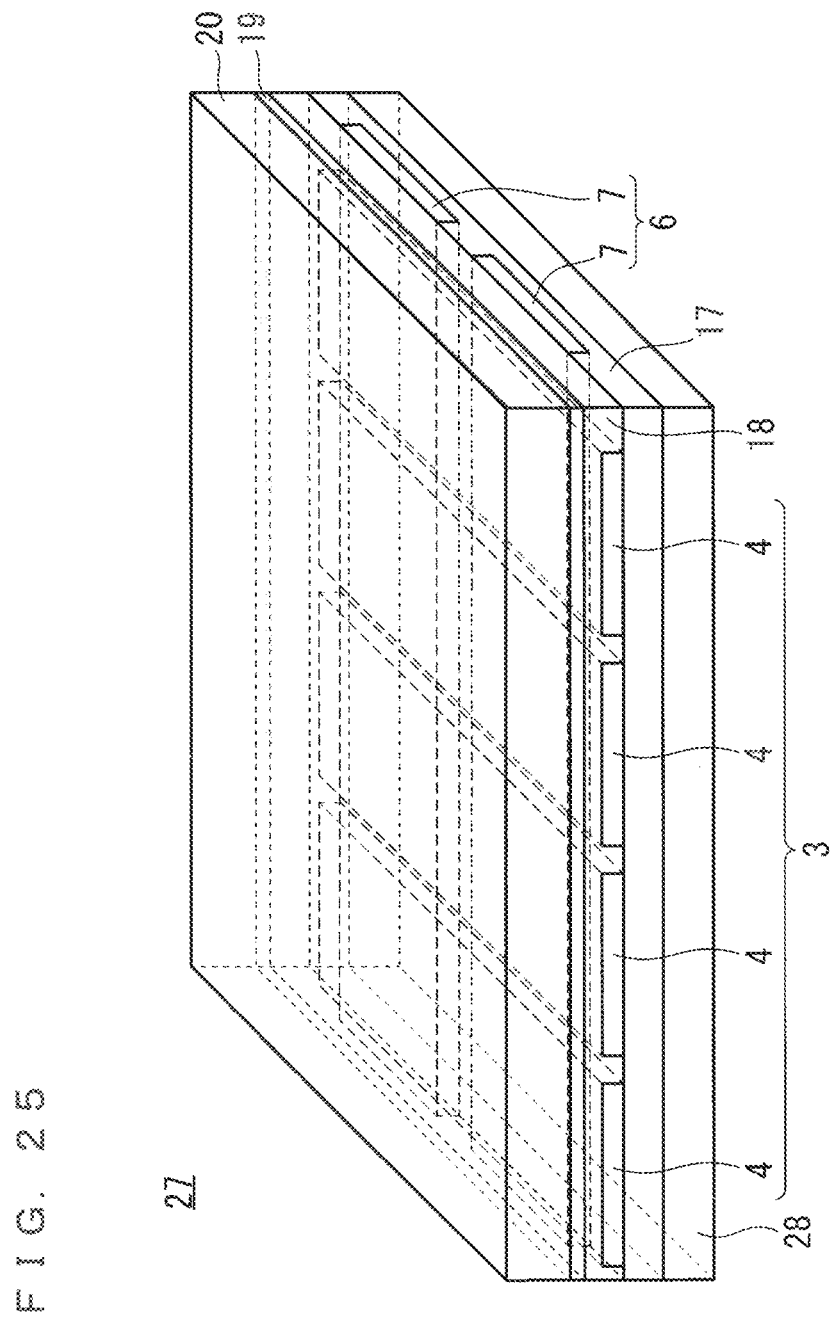
FIGS. 25 and 26 are perspective views showing an example of a configuration of a touch screen according to a preferred embodiment of the present invention.

In FIG. 13, the transparent substrate 16 may be a color filter substrate of a liquid crystal display. FIG. 25 is a perspective view showing a configuration of a touch screen 27. The touch screen 27 features that a color filter substrate 28 is provided in place of the transparent substrate 16 of FIG. 13. The other configurations are the same as those in FIG. 13. By employing the configuration shown in FIG. 25, it is possible to share the transparent substrate of the touch screen and the color filter substrate of the liquid crystal display. Therefore, it is possible to implement a whole reduction in a thickness in attachment of the touch screen 27 to the liquid crystal display.

Figure 26:
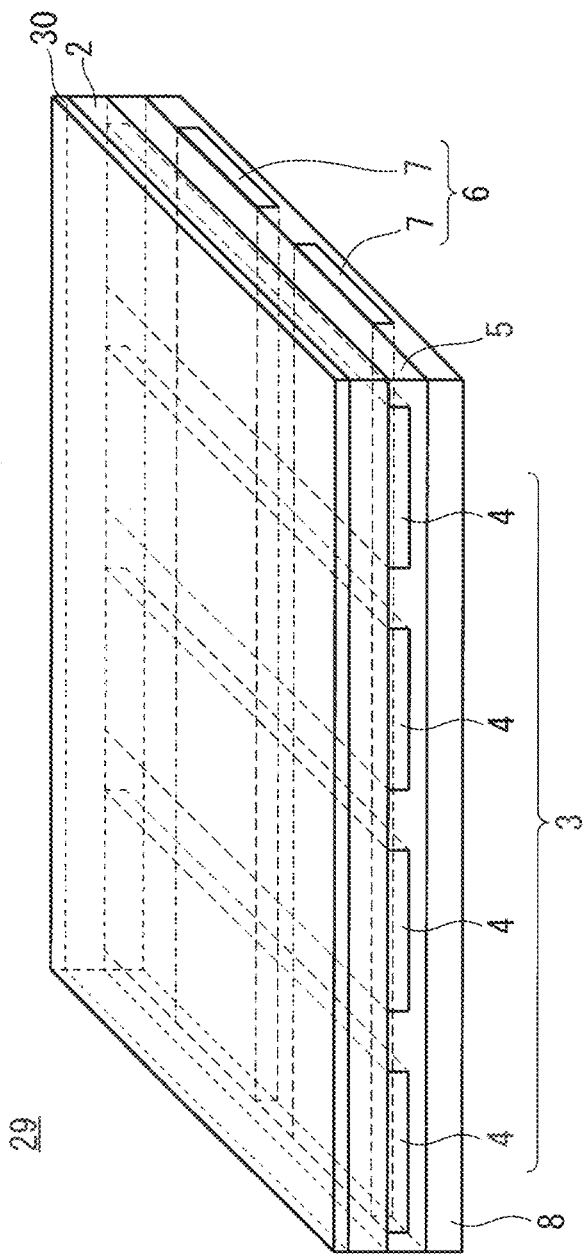

Moreover, a polarizing plate 30 may be provided on (stuck onto) the surface side of the transparent substrate 2 of the touch screen 1 shown in FIG. 1 and a touch screen 29 shown in FIG. 26 may be attached to a liquid crystal display with the polarizing plate 30 side set to be a display surface side. In this case, the transparent substrate 2 serves to protect the touch screen 29.

Although the description has been given of the case where the touch screen structure shown in FIG. 1 is employed in the first preferred embodiment, the present invention is not restricted thereto but the same advantages can be obtained even if the structures of the touch screens shown in FIGS. 13, 24 and 25 are employed.

While the invention has been shown and described in detail, the foregoing description is in all aspects illustrative and not restrictive. It is therefore understood that numerous modifications and variations can be devised without departing from the scope of the invention.

What is claimed is:

1. A touch screen comprising a plurality of row direction wires and a plurality of column direction wires provided to intersect with each other through an insulating film in planar view in a region corresponding to a region of a display element in which a plurality of sub-pixels are formed, said sub-pixels being disposed regularly in a lateral direction and a longitudinal direction and forming R, G and B having a pitch in said lateral direction of p/3, where p is the pitch of a pixel in said lateral direction, wherein said plurality of row direction wires includes a mesh-like wire having a plurality of first row direction wires extending in said longitudinal direction and a plurality of second row direction wires extending in said lateral direction, said plurality of column direction wires includes a mesh-like wire having a plurality of first column direction wires extending in said longitudinal direction and a plurality of second column direction wires extending in said lateral direction, and each of said first row direction wires and each of said first column direction wires are provided at an interval satisfying $((4/3)+n) \times p$ (n is an integer of zero or more).

2. The touch screen according to claim 1, wherein each of said first row direction wires and each of said first column direction wires are alternately provided at an interval of p/3 or more in a region in which said row and column direction wires intersect with each other in planar view.

3. The touch screen according to claim 1, wherein each of said row direction wires and each of said column direction wires are provided in an overlapping position with a black matrix pattern for dividing each of the sub-pixels in planar view.

4. The touch screen according to claim 1, wherein each of said row direction wires and each of said column direction wires are provided in a meandering form.

5. The touch screen according to claim 4 further comprising a polarizing plate disposed on a side of said plurality of row direction wires and said plurality of column direction wires opposite to said display element, wherein each of said row direction wires is provided in a meandering form in such a manner that a tangential line passing through an intersection point of each of said first row direction wires and each of said second row direction wires has an inclination of 10 degrees or less with respect to a polarizing axis of said polarizing plate, and each of said column direction wires is provided in a meandering form in such a manner that a tangential line passing through an intersection point of each of said first column direction wires and each of said second column direction wires has an inclination of 10 degrees or less with respect to said polarizing axis of said polarizing plate.

6. The touch screen according to claim 1, wherein when each of said first row direction wires and each of said first column direction wires have a line width t, each of said first row direction wires and each of said first column direction wires are provided at an interval of 100 t or more.

7. The touch screen according to claim 1, wherein said interval is selected in such a manner that said plurality of row direction wires and said plurality of column direction wires have the same width, and that a total area in planar view of said plurality of row direction wires and said plurality of column direction wires is equal to or smaller than 1% of an area of a whole display area.

8. A touch screen comprising a plurality of row direction wires and a plurality of column direction wires provided to intersect with each other through an insulating film in planar view in a region corresponding to a region of a display element in which a plurality of sub-pixels are formed, said sub-pixels being disposed regularly in a lateral direction and a longitudinal direction and forming R, G and B having a pitch in said lateral direction of p/3, where p is the pitch of a pixel in said lateral direction; and a polarizing plate disposed on an opposite side to said display element with respect to a plurality of row direction wires and a plurality of column direction wires, wherein each of said row direction wires and each of said column direction wires are provided with an inclination of 10 degrees or less with respect to a polarizing axis of said polarizing plate, wherein said plurality of row direction wires includes a mesh-like wire having a plurality of first row direction wires extending in said longitudinal direction and a plurality of second row direction wires extending in said lateral direction, said plurality of column direction wires includes a mesh-like wire having a plurality of first column direction wires extending in said longitudinal direction and a plurality of second column direction wires extending in said lateral direction, and each of said first row direction wires and each of said first column direction wires are alternately provided in the lateral direction at an interval of more than p.

9. A touch screen comprising:

a plurality of row direction wires and a plurality of column direction wires provided to intersect with each other through an insulating film in planar view in a region corresponding to a region of a display element in which a plurality of sub-pixels are formed, said sub-pixels being disposed regularly in a lateral direction and a longitudinal direction, having a pitch in said lateral direction of $p_1/3$, where $p_1$ is a pitch of a pixel in said lateral direction, a pitch in said longitudinal direction of $p_2$, where $p_2$ is a pitch of said pixel in said longitudinal direction, and forming R, G and B satisfying $\tan^{-1}(p_1/6p_2) \leq \pi/18$, and a polarizing plate disposed on a side of said plurality of row direction wires and said plurality of column direction wires opposite to said display element, wherein said plurality of row direction wires includes a mesh-like wire having a plurality of first row direction wires extending in said longitudinal direction and a plurality of second row direction wires extending in said lateral direction, said plurality of column direction wires include a mesh-like wire having a plurality of first column direction wires extending in said longitudinal direction and a plurality of second column direction wires extending in said lateral direction, and each of said first row direction wires and each of said first column direction wires are provided at an interval of 1.5 $np_1$ (n is a positive integer which is greater than zero) and are disposed with an angle θ formed by a polarizing axis of said polarizing plate satisfying $\tan \theta = p_1/6p_2$.

10. The touch screen according to claim 9, wherein when each of said first row direction wires and each of said first column direction wires have a line width t, each of said first row direction wires and each of said first column direction wires are provided at an interval of 100 t or more.

\* \* \* \* \*